US007346528B2

(12) United States Patent
Thengvall et al.

(10) Patent No.: US 7,346,528 B2
(45) Date of Patent: Mar. 18, 2008

(54) INTEGRATED DECISION SUPPORT SYSTEM FOR OPTIMIZING THE TRAINING AND TRANSITION OF AIRLINE PILOTS

(75) Inventors: Benjamin Glover Thengvall, Austin, TX (US); Julian Enrique Pachon, Austin, TX (US)

(73) Assignee: Navitaire, Inc., Minneapolis, MN (US)

( * ) Notice: Subject to any disclaimer, the term of this patent is extended or adjusted under 35 U.S.C. 154(b) by 1052 days.

(21) Appl. No.: 10/054,343

(22) Filed: Nov. 13, 2001

(65) Prior Publication Data

US 2003/0105656 A1 Jun. 5, 2003

(51) Int. Cl.
*G06F 17/50* (2006.01)
(52) U.S. Cl. .................... 705/7; 705/5; 705/9
(58) Field of Classification Search ............ 705/7, 705/8, 5, 9
See application file for complete search history.

(56) References Cited

U.S. PATENT DOCUMENTS

| | | | |
|---|---|---|---|
| 4,797,839 | A | 1/1989 | Powell |
| 5,265,006 | A | 11/1993 | Asthana et al. |
| 5,450,317 | A | 9/1995 | Lu et al. |
| 5,794,224 | A | 8/1998 | Yufik |
| 6,064,981 | A | 5/2000 | Barni |
| 6,076,067 | A | 6/2000 | Jacobs et al. |
| 6,078,912 | A | 6/2000 | Buerger et al. |
| 6,161,097 | A | 12/2000 | Glass et al. |
| 6,240,362 | B1 | 5/2001 | Gaspard, II |
| 6,263,315 | B1 | 7/2001 | Talluri |
| 6,275,767 | B1 | 8/2001 | Delseny et al. |
| 6,275,812 | B1 | 8/2001 | Haq et al. |
| 6,278,965 | B1 | 8/2001 | Glass et al. |
| 6,292,806 | B1 | 9/2001 | Sandifer |
| 6,408,276 | B1 * | 6/2002 | Yu et al. .................... 705/7 |
| 6,651,046 | B1 * | 11/2003 | Sato et al. .................... 706/13 |
| 6,790,041 | B2 * | 9/2004 | Fountain ................... 434/30 |

FOREIGN PATENT DOCUMENTS

EP 1072991 A2 * 1/2001

OTHER PUBLICATIONS

Rittri et al (Scheduling Pilot Training) discloses the concept of a scheduling component for activities with complex constraints for pilot training.*
Brusco et al (Improving Personnel Scheduling At Airline Stations), Oct. 1995, Operations Research, pp. 741-751.*
Gang Yu, Benjamin Thengvall, Julian Pachon, Darryal Chandler, & Al Wilson, "Optimized Pilot Planning and Training at Continental Airlines" INFORMS, Oct. 17, 2001, U.S.
Peter J. Verbeek, "Decision Support Systems—An application in strategic manpower planning of airline pilots", European Journal of Operational Research, Vo. 55 (1991), pp. 368-381.

* cited by examiner

*Primary Examiner*—Romain Jeanty
(74) *Attorney, Agent, or Firm*—Oppenheimer Wolff & Donnelly LLP

(57) ABSTRACT

An automated optimization system for generating training plans for airline pilots covering both pilot transitions and assignment to training classes for pilots who have received a system bid award, wherein such training plans are generated in less than one hour by first solving a MIP Model of the training/transition problem with an LP relaxation to determine a first level of feasibility, and then solving the MIP Model for an optimized feasible solution from which the training plan is derived.

48 Claims, 5 Drawing Sheets

INTEGRATED DECISION SUPPORT SYSTEM FOR OPTIMIZING THE TRAINING AND TRANSITION OF AIRLINE PILOTS

FIELD OF THE INVENTION

The invention relates generally to decision support systems, and more particularly to an interactive and integrated decision support system for providing alternative optimized training plans to strategic planners.

BACKGROUND OF THE INVENTION

Numerous systems have been developed to overcome the complexity of determining when training and transition is to occur, and for which crew members, at which locations, at what times, and with an appropriate allocation of training resources including equipment and instructors.

The prior art systems have included both manual and automated systems with response times ranging from days, to weeks, and even months. Further, such systems have tended to implement a decision making process for providing a single solution, rather than a dynamic, adaptive, decision support system providing alternative solutions for evaluation by a strategic planner. In addition, such prior systems have been represented by models which either are too complex for commercial software solution, or have simplifying assumptions that make them too unrealistic for practical use. Prior systems also have generally been too costly in employee and equipment resources. See "Decision Support Systems-An application in strategic manpower planning of airline pilots" by Peter J. Verbeek, European Journal of Operational Research 55 (1991), pages 368-381, Elsevier Science Publishers B.V. While the Verbeek article does not disclose a decision support system, it does describe the enormous complexities which must be addressed in designing such a system to accommodate the large numbers of constraints and variables that are required for a solution to be realistic. A reference is made in the article to mixed integer models solved by linear programming (LP) which were developed by United Airlines and American Airlines, but fell short of being both realistic and optimal. Verbeek also referred to his own mixed integer model which was admittedly to complex for solution with commercial software, and thus too costly in time.

The article, "Course Planning at Lufthansa Technical Training: Constructing More Profitable Schedules", by Knut Haase, Jorg Latteier, and Andreas Schirmer, INTERFACES 29:5 September-October 1999 (pp. 95-109) likewise does not disclose a specific model, but rather describes the enormity of the problems faced in attempting to design and develop a decision support system which can accommodate continuing data input changes while realizing reduced costs in creating training plans. No indication of creating and placing comparative values on alternative plans to generate multiple training plan options is indicated. Further, no indication of turnaround time is provided.

From the above it may be discerned that the problem of pilot staffing and training is one of the most complex and costly problems facing the major airlines. If not managed effectively, an airline cannot survive, not to mention profit, in the competitive air transportation market.

By way of example, Continental airlines provides both domestic and international service to more than 100 destinations around the world. They operate 325 aircraft of nine different fleet types to fly 1400 daily flights. Their 5000 pilots are stationed at three domestic and two international crew bases. At least twice a year Continental conducts a system bid award. These awards provide an opportunity for pilots to use their seniority to increase their pay and improve their work schedules by changing their position (base, fleet, and status), and a way for the airline to adjust staffing levels in response to retirements, attrition, and changes in their business plan. In an average system bid award, 15-20% of the airline's pilots receive new positions. The problem of taking the 15-20% of Continental's pilots who have received new positions, and finding a training class for each pilot requiring training, an advancement date for each pilot changing position without training, and a release date for each pilot leaving the airline is a very large NP-hard problem which must be solved. Additional complexity for Continental comes from the facts that: pilot positions are interrelated; the timing and number of training classes is variable; minimal length student training schedules must be generated using limited resources; and numerous complicating regulations and business rules related to each pilot's seniority, flight history, and current and future position must be considered.

Continental manpower planners with expert knowledge took more than two weeks to manually generate a single, partial, sub-optimal training plan for ensuring adequate staffing levels with no detailed consideration of costs.

In contrast to prior systems and methods, the invention described and claimed herein is a realistic representation of the real world problem as evidenced by its implementation by Continental Airlines, and is modeled so efficiently that it can be solved in under an hour. An hour is a huge improvement over the time required by the prior art systems, and is a very reasonable amount of time for a planning problem as complex as the one addressed by this invention.

The invention as described herein has been developed by CALEB Technologies Corp. of Austin, Tex., as part of an integrated decision support system, referred to as the ManpowerSolver system, to face this challenge. The ManpowerSolver system manages large volumes of data and employs state-of-the-art optimization modeling and solution techniques to efficiently allocate human and training resources, and attain optimal operational and cost effective performance.

In response to a system bid award, the ManpowerSolver system in accordance with the invention builds a training plan that establishes the timing and number of pilot new hires, training assignments, advancements, and releases. It also determines the number of pilots whose training or release should be postponed, and the flow of pilots across different positions in a manner that ensures adequate staffing levels, minimum cost, and efficient utilization of training resources.

By exercising different parameter settings, multiple high-quality solutions are generated that can be carefully examined before a suitable one is chosen by the user. The substantial time and process savings, however, are dwarfed by the savings derived from implementing an optimized solution that not only provides complete coverage of flights, but also significant dollar savings from reduced staffing costs, pay protection costs, and training costs. Staffing cost savings come from decreases in the number of new pilots hired, postponement of new pilot hires, quicker release of pilots without an award, and providing just-in-time training to minimize pilots being trained long before they are needed. Training cost savings arise from better utilization of expensive resources, reduced time for pilots to complete training, and a reduction in the number of training cycles required. Overall, Continental has estimated a dollar savings in excess of $10 million annually.

The primary objective of the training plans produced by the invention described and claimed herein is to have pilots in place at each combination of base (assigned geography), fleet, and status (seat) to cover all of the published flights. Secondary objectives include minimizing staffing, pay protection, and training and hiring costs. Constraints that are considered include pilot vacations and absences, available training resources, new hires, seniority, and training policies.

To solve the pilot training and transitioning (staffing) problem the ManpowerSolver system relies on a loosely coupled solution methodology that employs a unique combination of modeling and algorithmic approaches. Innovative aspects of this methodology include a decomposition of the problem into a series of linear and mixed integer programs, and a specialized branch and bound algorithm with custom branch ordering and node bounding techniques. Alternative cost effective training plans are produced and evaluated for selection of the training plan deemed most suitable to the airline.

The system can also be used in a what-if mode to gauge the impact that various operating decisions will have on pilot staffing and training. This tool allows crew planners to be proactive as they face changes in the airline such as new market opportunities, the acquisition and retirement of aircraft and training resources, opening and closing sub-bases, and modification to the number of hours to be flown from different pilot positions to allow the airline to take advantage of business opportunities.

This integrated approach to workforce management that takes into account the broad spectrum of hiring, staffing, training, and absence is the first in the airline industry. The concept and framework as well as some of the solution techniques are general enough to be applied to industries other than airlines that desire a skilled workforce.

SUMMARY OF THE INVENTION

An adaptive, dynamic, automated optimizer system and method for rapid generation of multiple alternative training plans for all pilots of an airline who have received a system bid award, and who have been awarded a change of position, whether by advancement, furlough, or no award, wherein such training plans are derived from an optimized and realistic solution of a mixed integer programming representation of the pilot training/transition problem.

In one aspect of the invention, pilot data and other information received from a user are sorted into segregated lists from which variables and constraints are created, and an MIP Model of the training/transition problem is developed from the variables and constraints.

In another aspect of the invention, an LP relaxation of the MIP Model is first made and solved before solving the MIP Model to determine a first level of feasibility, and the MIP Model is thereafter solved to provide a feasible and optimized solution of the MIP Model in a short period of time.

In yet another aspect of the invention, costs associated with a solution of the LP relaxation of the MIP Model are calculated and used to modify cost factors in the objective function of the MIP Model, thereby providing weightings of both block hour and dollar costs.

In still another aspect of the invention, multiple alternative solutions of the MIP Model may be generated by altering parameters including one or more of sub-base openings, sub-base closings, vacation cancellations, level of importance, costs, capacity, excesses, shortages, and training resource availability.

In a further aspect of the invention, the pilot training/transition problem is represented by a MIP Model comprised of an objective function, with variables and constraints, which is simplistic enough for commercial software solution.

In yet a further aspect of the invention, comparative values are placed on alternative multiple training plans to assist the user in selecting a training plan to be used.

In a still further aspect of the invention, continuing data input changes are accommodated while realizing reduced staffing, pay protection, and training costs in generating multiple, alternative training plans which cover all published flights, and which provide timing and number of pilot new hires, training assignments, advancements, and releases.

In an additional aspect of the invention, the invention may be used in a what-if mode to guage the impact that various operating decisions will have on pilot staffing and training.

In yet an additional aspect of the invention, the solution of the MIP Model is optimized by minimizing the objective function of the MIP Model to have a lowest value within a region defined by the constraints of the MIP Model.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Figure 1:
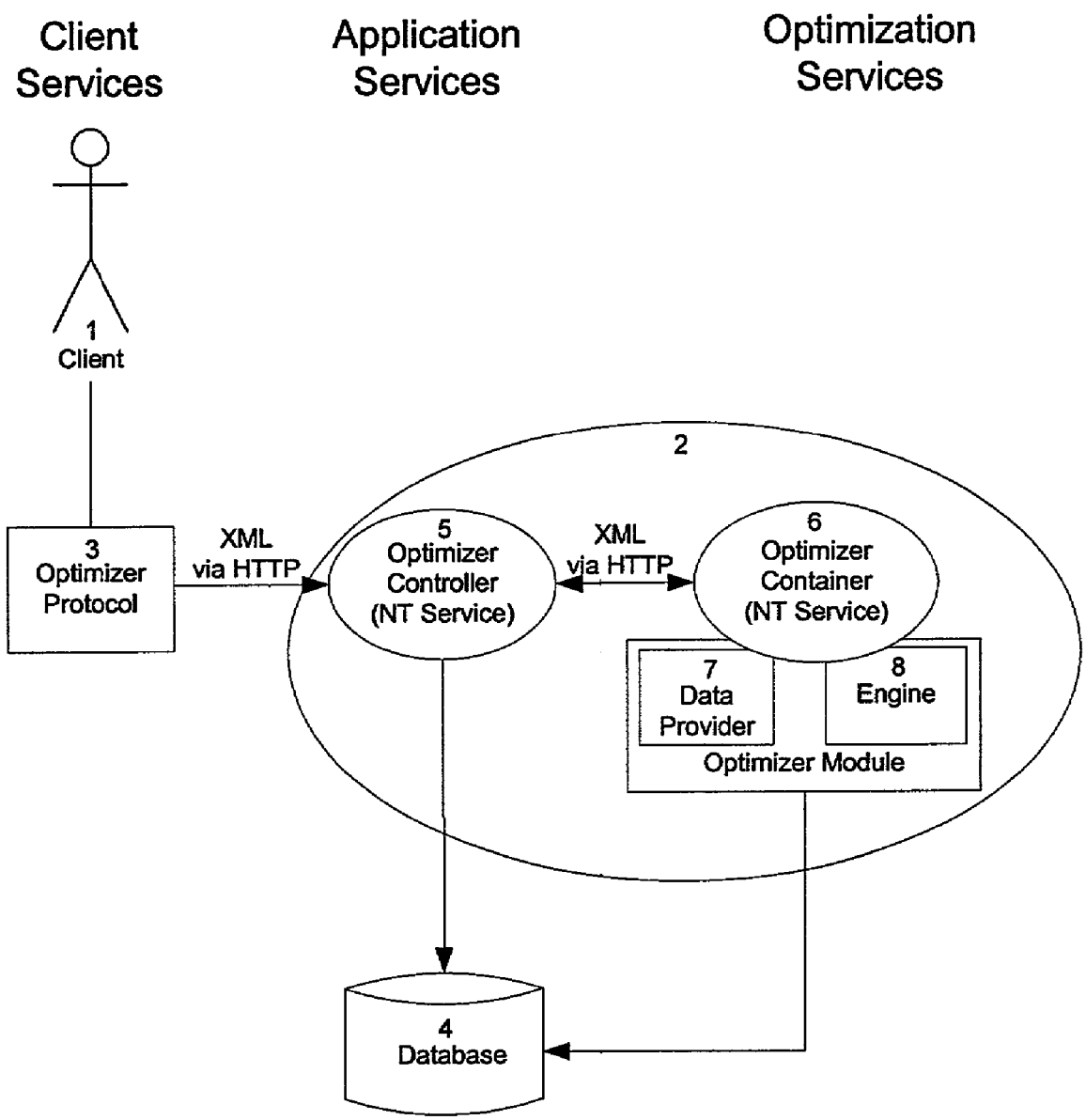
FIG. 1 is a functional block diagram of a training plan optimization system in accordance with the invention.

Preferred embodiments of the invention will now be described with reference to the accompanying drawings. In the description, the following terms, whether capitalized or in lower case, shall have the attendant meanings indicated below when used in this specification:

TABLE I

| Term | Definition |
|---|---|
| System Bid | A seniority-based award in which an airline adjusts staffing levels in response to retirements, attrition, and changes in their business plan by awarding pilots new positions. |
| System Bid Information | Complete information on a pilot's awarded position from a specific system bid. |
| Bid Effective Date | Date by which all pilots should be advanced to their awarded positions for a specific system bid. |
| Average Pay Hours | Average number of hours per bid period for which a pilot in a certain position is paid. |
| Utilization | Average number of hours per bid period during which a pilot works. |
| Bid Period | A time period roughly equivalent to a calendar month. |

TABLE I-continued

| Term | Definition |
| --- | --- |
| Training Capacity | Maximum number of students that can start training for a given fleet in a given bid period. |
| Pay Protection | Penalty paid to a pilot in certain cases where a junior pilot is advanced ahead of a senior pilot. |
| Training Plan | Establishes the timing and number of pilot hires, training assignments, advancements, and releases. |
| Training Schedule | Detailed daily schedule for all students and training resources based on the classes found in the training plan. |
| Total Shortage | The shortage of pilots measured as the deficit in ability to cover block hours in each pilot position each bid period. |
| Percentage Shortage | The shortage of pilots measured as a percentage of the total number of pilots needed. |
| Total Excess | The excess of pilots measured as the overage in ability to cover block hours in each pilot position each bid period. |
| Percentage Excess | The excess of pilots measured as a percentage of the total number of pilots needed. |
| MIP Model | The mixed integer programming mathematical model that represents the training and transition problem for airline pilots, and which is used to obtain solutions to this problem. |
| Key | The unique identifier of a variable or constraint in the model. |
| Level of Importance | The weighting (1-5) given to each cost factor demonstrating its importance relative to other cost factors |
| Cost Factor | An item used to weigh the value of one solution vs. other solutions |
| Optimizer Engine | An optimizer or optimizer engine is a program implementing operations research algorithms, and producing an optimized solution based upon user input and system data. |
| Optimizer Session | A request to an optimizer engine to perform its function. |
| Optimizer Container | A generic hosting environment in which Optimizer Engines execute Optimizer Sessions. |
| Objective Function | An objective or objective function is an algebraic expression that combines variables with variable costs. |
| Status | The seat a pilot is assigned to in an aircraft, for example captain, first officer, or second officer. |
| Equipment | A type of aircraft. |
| Displaced Pilot | Pilot who receives a system bid award for a lower paying position. |
| Straight Displacement Pilot | Pilot who receives a system bid award for a lower paying position that does not require training, only advancement. |
| Advanced Pilot | Pilot who has moved from an old assignment to a new awarded assignment. |
| Straight Advance Pilot | Pilot who receives a system bid award that does not require training, only advancement. |
| Furloughed Pilot | Pilot who receives a system bid award indicating that he will be released from the airline. |
| No Award Pilot | Pilot having a greater than 60 age who receives a bid award indicating that he must be released from the airline. |
| Included Pilot | Pilot whose new system bid award involves movement to a new position in the airline, or who is released or furloughed from the airline. |
| Age 58 Pilot | Pilot who will be 58 or older by the effective date of the system bid. |
| (58Y) | These pilots have special rules for bidding and pay protection. |
| Base | A geographical location where pilots are stationed. |
| Sub-base | A combination of a type of aircraft and a base. |
| Position | A combination of a sub-base and status, for example a pilot may be a captain flying DC10 aircraft out of the Houston base. |
| Sub-base Setting | Option for the user to generate a training plan using block hours by fleet or by sub-base. |
| Block Hours | The scheduled flight hours the airline plans to operate. |

The environment in which the invention operates is illustrated in FIG. 1, in which user requests and input data are provided by a client 1 to an optimizer system 2 by way of a user interface including an optimizer protocol layer 3. The optimizer protocol layer 3 uses an XML-based transaction protocol via HTTP over TCP/IP to communicate with the optimizer system 2, and to provide input data to a data base 4. In the preferred embodiment, the optimizer system 2 is deployed on a Compaq ProLiant Server with 4 Pentium III 550 MHz processors.

The data base 4 has stored therein information including but not limited to pilot data including system bid award information, average pay hours, pilot utilization, pay protection, pilot vacation and absence information, and retirement criteria; and training information including training capacity by fleet, and operational and contractual constraints affecting training. The data base also stores customer optimization requests and information associated with each request including but not limited to optimization options such as allowing cancellation of vacations, exceeding class capacity, grouping pilots in classes, sub-base settings to solving the training plan problem by fleet or sub-base, and request status information. In the preferred embodiment, the data base 4 is a Microsoft SQL Server 2000 relational database.

The optimizer system 2 is comprised of an optimizer controller 5 which receives user requests from the optimizer protocol layer 3, and notification and optimizer update messages from an optimizer container 6 whose primary function is to communicate with an optimizer data provider 7 and an optimizer engine 8. In the preferred embodiment, the data base 4, the optimizer controller 5, and the optimizer container 6 are part of a computer system operating under the Microsoft Windows 2000 Advanced Server Operating System.

In response to a user request, the optimizer controller 5 creates an optimizer session for storage into the data base 4, and sends a request acknowledgement and an optimizer session reference to the optimizer protocol layer 3 for relay to the user. Thereafter, the optimizer controller 5 notifies the optimizer container 6 of the request for services by way of an RPC call (processing instructions provided by the XML transaction protocol) routed via HTTP over TCP/IP (a transport protocol implementation).

The optimizer container 6 thereupon verifies to the optimizer controller 5 that it has the necessary resources and request parameters to accommodate the user request. The optimizer container 6 then initializes the optimizer data provider 7 to obtain necessary data from the data base 4 for use by the optimizer engine 8. In the preferred embodiment, the data provider 7 and the optimizer engine 8 are deployed as Windows dynamic link libraries.

The optimizer engine 8, which in the preferred embodiment is an optimizer engine solving a training plan problem, implements operations research algorithms to produce an optimized solution based on the received request. In response to the above verification from the optimizer container 6, the optimizer controller 5 updates the optimizer session status stored in the data base 4 to indicate that the user request is being executed. The optimizer communications layer 3, upon polling the optimizer controller 5, is thereby notified of the status of the user request and so informs the client 1. Once the optimizer data provider 7 is initialized, the optimizer container 6 sends the user request to the optimizer engine 8 for execution.

The results obtained from the optimizer engine 8 are received by the optimizer container 6, which forwards the results to the optimizer controller 5. The optimizer controller 5 thereupon updates the optimizer session status to indicate that the user request has been executed, and that the results are available for access by the user.

Upon the user querying the optimizer controller 5 by way of the optimizer protocol layer 3, the user is informed that the user request has been executed and is provided the results generated by the optimizer engine 8.

The invention described and claimed below resides in the optimizer engine 8 in the form of a software program for developing, solving, and interpreting the results of a mixed integer programming (MIP) model that provides an optimized solution to the problem of training and transitioning airline pilots following a system bid award.

Figure 2:
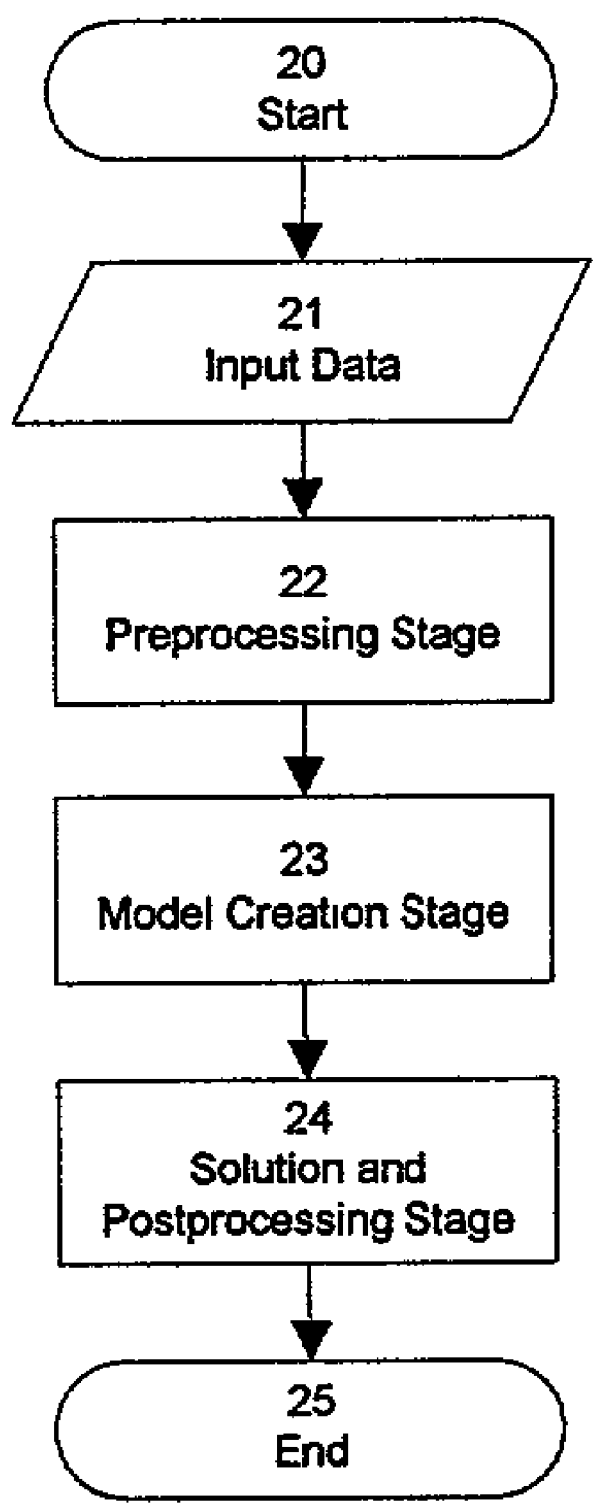
FIG. 2 is a logic flow diagram of the optimizer engine 8 of FIG. 1.

A functional block diagram of the optimizer engine 8 is provided in FIG. 2, where the logic flow process in accordance with the invention begins at logic step 20, and then proceeds to logic step 21 where data provided by the optimizer data provider 7 of FIG. 1 by way of optimizer container 6 is received by an input data module. Such data includes bid information, average pay hours, utilization, pay protection, training capacity, operational and contractual constraints affecting training, variables such as vacation and retirement criteria, and optimizer options such as allowing cancellation of vacations, exceeding class capacity, grouping pilots in classes, and solving the training plan problem by fleet or base.

The logic flow process continues from logic step 21 to logic step 22 where the content of the input data module of logic step 21 is applied in the form of an XML document to a preprocessing stage. The preprocessing stage in turn creates data structures that provide separate lists of pilots which have been sorted in accordance with received user options and other input data. The data structures of logic step 22 then are applied by the logic flow process to a model creation stage at logic step 23, and are operated upon to create a mathematical mixed integer programming model (MIP Model) that represents the pilot training and transition problem mathematically through an objective function and a combination of constraints and variables. Once the MIP Model is created, the logic flow process continues to the model solution and postprocessing stage of logic step 24, where optimal variable values are found for the MIP Model. The optimal variable values then are postprocessed to determine and display the solution results. The solution is referred to as a training plan that is then stored and may be viewed by the user.

The MIP model is presented below followed by detailed logic flow descriptions of each of the stages illustrated in FIG. 2.

Model Indices The indices which are used in the MIP Model variables and equations that follow are defined in Table II.

TABLE II

| Index | Index Description |
| --- | --- |
| i | Pilots. For each pilot the type of class he needs to attend is known. |
| f | Fleets |
| h | Combinations of Fleet and Status. If the problem is solved by position, then h will correspond to the combination's base, equipment, and status. |
| t | Bid periods (including an extra bid period for those pilots that will not be trained during the planning horizon due to capacity constraints). |
| j | A duplicate index used to represent pilots. |

Model Sets

The sets which are used in the MIP Model equations that follow are presented in Table III.

TABLE III

| Set | Set Description |
| --- | --- |
| $\phi(i)$ | Bid periods in which pilot i can complete his training. This set is determined during the preprocessing of variables described above. |
| $\phi(f,t)$ | Pilots that can start training fleet f in the bid period t. |
| $\lambda$ | Set of pilots that need to be advanced. |
| $\lambda_1$ | Set of pilots that need to be advanced, not including the 58 year old pilots that hold a bid and could have held a better bid. |
| $\lambda_2$ | Set of pilots 58 years old that hold a bid and could have held a better bid. |
| APP | Set of pilots already pay protected. |
| NA | Pilots with no-award who will turn age 60 between now and the effective date of the system bid award. |
| F | Furlough no award pilots. |
| H(h) | Pilots whose initial position is h (these are pilots that belong to $\lambda$, NA, F). |
| H'(h) | Pilots whose future position is h (these are pilots that belong to $\lambda$, NH). |
| SA(h) | Pilots who are straight advances whose future position is h. |
| SD(h) | Pilots who are straight displacements whose future position is h. |
| PP(i) | Pilots who may cause pilot i to be in pay protection. This set is determined by a preprocessing and clustering of pilots with the same bid effective date and future position, and ranking them in seniority order. |
| 58Y | Pilots 58 years old who did not hold a bid but were senior enough to hold a bid, and will be pay-protected. |
| $PP_{58}(i)$ | Pilots who may cause pilot $i \in 58Y$ to be in pay protection. |
| L(i) | Length of training for pilot i {PS = 2, RQ = 1, Upgrade = 1, Advance = 0}. |

Model Parameters

The parameters which are used in the MIP Model equations that follow are defined below.

TABLE IV

| Parameter | Description Of Parameter |
| --- | --- |
| $CAP_{ft}$ | Maximum number of students that can start training for fleet f (course training type) in bid period t. |
| $Initial_{ht}$ | Initial number of hours for position h in the bid period t. This value is obtained by multiplying the number of pilots in a given position and bid period by the respective utilization (headcount should consider retirements and absences). |
| $a_i$ | Pay protection cost paid to pilot i per month, if any (difference between his future pay rate and his current pay rate). |
| $uti_{ht}$ | Utilization per position h per bid period t. |
| PBH | Cost associated with block hours. |
| PS | Level of importance of shortages in block hours in the solution. |
| PE | Level of importance of excess in block hours in the solution. |
| $P_{pay}$ | Level of importance of pay protection cost in the solution. |
| PNH | Level of importance of new hires cost in the solution. |
| PNA | Level of importance of no-awards cost in the solution. |
| PF | Level of importance of furloughs cost in the solution |
| $\alpha_{ht}$ | Maximum percentage in shortages per position h per bid period t, after which shortages will be minimized. |
| $\beta_{ht}$ | Maximum percentage in excess per position h per bid period t, after which excess will be minimized. |
| $MNH_{ht}$ | Maximum allowable new hires for position h in bid period t |
| $NHCost_{ht}$ | Cost per new hire pilot advanced to position h in bid period t (computed as number of bid periods between t and the end of planning horizon, times the pay rate, times the average pay hours). |
| $NACost_{it}$ | Cost if pilot $i \in NA$ is released in bid period t (computed as number of bid periods between t and the beginning of planning horizon, times the pay rate, times the average pay hours). |

TABLE IV-continued

| Parameter | Description Of Parameter |
|---|---|
| FCost$_{it}$ | Cost if pilot i∈F is released in bid period t (computed as number of bid periods between t and the beginning of planning horizon, times the pay rate, times the average pay hours). |
| BidEff$_i$ | Bid effective date for pilot i. |
| Blockhrs$_{ht}$ | Business plan block hours for position h in bid period t. |
| N | Length of the planning horizon. |
| G$_i$ | Bid period in which pilots will start being pay protected due to a more junior pilot in training at the beginning of the planning horizon. If the pilot is already pay protected, then G$_i$ = 0. |
| Last | Last bid period in which the shortages and excess in block hours will be penalized. |

Model Variables

The variables appearing in the MIP Model equations that follow are described below.

For Pilots included in the training set (i∈λ):

$$y_{it} = \begin{cases} 1 & \text{if pilot } i \text{ is advanced in bid period } t \\ 0 & \text{otherwise} \end{cases} \quad (1)$$

The $y_{it}$ variable will only exist for bid periods during which pilot i is eligible to complete his training. Some bid periods may not be possible due to vacation or other absences.

For pilots included in the No-Award set (i∈NA):

$$y_{NAit} = \begin{cases} 1 & \text{if pilot } i \text{ is advanced in bid period } t \\ 0 & \text{otherwise} \end{cases} \quad (2)$$

For pilots included in the Furlough set (i∈F):

$$y_{Fit} = \begin{cases} 1 & \text{if pilot } i \text{ is advanced in bid period } t \\ 0 & \text{otherwise} \end{cases} \quad (3)$$

RF$_i$ is computed as:

$$RF_i \geq \left( N - R_{58i} - \sum_{t \in \phi(i)} t y_{it} + R_i \right), \quad (4)$$

where N−R$_{58i}$ is the bid period a pilot starts being pay-protected for the position he could have held but did not (for all pilots 58 years old with bid and potential pay protection different from zero); and $$\sum_{t \in \phi(i)} t y_{it} - R_i$$

is the bid period the pilot starts being pay-protected for the position he holds. When the position the pilot could have held is better than the one he holds, he can always get at least the R$_{58i}$ and could potentially receive more bid periods of pay protection (i.e. M$_i$).

Other variables are defined in Table V below.

TABLE V

| Variable | Variable Definition |
|---|---|
| Y$_{NHht}$ | The number of new hires advanced in bid period t for position h. |
| z$_{ft}$ | Number of pilots exceeding the training resource capacity in the bid period t for fleet f. |
| S$_{ht}$ | Number of block hours short for position h in the bid period t. |
| E$_{ht}$ | Number of excess block hours for position h in the bid period t. |
| R$_i$ | Number of bid periods in pay protection paid to pilot i∈λ. |
| QA$_i$ | Advance bid period of the junior pilot who advances the earliest before pilot i∈λ. |
| M$_i$ | Min (RF$_i$, R$_i$), the total number of months the pilot is pay-protected for the position he holds. |
| R$_{58i}$ | Number of bid periods in pay protection paid to pilot i∈58Y (for all pilots 58 years old with bid and no bid). |

$$A_{1i} = \begin{cases} 1 & \text{if the minimum (RF}_i, R_i) \text{ is RF}_i \\ 0 & \text{otherwise} \end{cases} \quad (5)$$

$$A_{2i} = \begin{cases} 1 & \text{if the minimum (RF}_i, R_i) \text{ is R}_i \\ 0 & \text{otherwise} \end{cases} \quad (6)$$

MIP Model

Objective Function $$\text{Minimize } PNH \sum_t \sum_h NHCost_{ht} y_{NHht} + PNA \sum_t \sum_{i \in NA} NACost_{it} y_{it} + \quad (7)$$
$$PF \sum_t \sum_{i \in F} FCost_{it} y_{it} + Ppay \left( \sum_{i \in \lambda_1} a_i R_i + \sum_{i \in 58Y} a_i R_{58i} \sum_{i \in \lambda_2} a_i M_i \right) +$$
$$PS * PBH \sum_h \sum_t S_{ht} / Blockhrs_{ht} +$$
$$PE * PBH * (1/3) \sum_h \sum_t E_{ht} / Blockhrs_{ht}$$

Model Constraints

The following constraints along with the objective function of equation (7) make up the core model. Other constraints may be added, as explained in the following section, to account for various user options.

The constraint that all pilots will be trained is represented by the following:

$$\sum_{t \in \phi(i)} y_{it} = 1 \quad \forall i \in \lambda, \quad (8)$$

where ∀ is a symbol which means "for all", ∈ is a symbol which means "in the set", and thus ∀i∈λ means "for all pilots i in the set λ". Therefore, this constraint appears once for each pilot in the set λ.

To ensure that all pilots who are straight advances to the same position are advanced in seniority order and that all pilots who are straight displacements are advanced in reverse seniority order:

$$\sum_t ty_{it} - \sum_t ty_{i+1,t} \leq 0 \quad \forall\, h, i \in SA(h) \tag{9a}$$

$$\sum_t ty_{i+1,t} - \sum_t ty_{it} \leq 0 \quad \forall\, h, i \in SD(h) \tag{9b}$$

In order to ensure that all new hires are hired, the following constraint may be added:

$$\sum_t y_{NHht} = Total_h \quad \forall\, h. \tag{10}$$

To ensure that any new hires advance after any existing pilot who is a straight advance for the same position:

$$y_{NHht} - MNH_{ht} \sum_{j=1}^{t} y_{ij} \leq 0 \quad \forall\, h, t, i \in SA(h) \tag{11}$$

To ensure that all 60 year old no award pilots are released, $$\sum_t y_{NAit} = 1 \quad \forall\, i \in NA. \tag{12}$$

To ensure that all Furlough pilots are released, $$\sum_t y_{Fit} = 1 \quad \forall\, i \in F. \tag{13}$$

To ensure that the capacity of training facilities is not exceeded, $$\sum_{i \in \varphi(t,f)} y_{i,t+L(i)} \leq CAP_{ft} \quad \forall\, t, f. \tag{14}$$

In order to compute the shortages in block hours per position, $$\left( \sum_{i \in H(h), k \leq t} y_{ik} * uti_{hk} - \sum_{i \in H'(h), k \leq t} y_{ik} * uti_{hk} \right) - S_{ht} \leq \tag{15}$$

$$Initial_{ht} - Blockhrs_{ht}(1 - \alpha_{ht}) \quad \forall\, (h, t).$$

To compute the excesses in block hours per position:

$$\left( \sum_{i \in H(h), k \leq t} y_{ik} * uti_{hk} - \sum_{i \in H'(h), k \leq t} y_{ik} * uti_{hk} \right) + E_{ht} \geq \tag{16}$$

$$Initial_{ht} - Blockhrs_{ht}(1 + \beta_{ht}) \quad \forall\, (h, t).$$

To compute the pay protection for pilots in the training set based on the order in which pilots are trained and advanced, the following three constraints are added:

$$R_i \geq \left( \sum_{t \in \phi(i)} ty_{it} - QA_i \right) \quad \forall\, i \in \lambda. \tag{17a}$$

$$QA_i \leq QA_j \quad \forall\, i \in \lambda,\ j \rightarrow next\_in\_P(i). \tag{18a}$$

$$QA_i \leq \sum_{k \in \phi(j)} ky_{jk} \quad \forall\, i \in \lambda,\ j \rightarrow next\_in\_P(i). \tag{19a}$$

In the case of displaced pilots:

$$R_i \geq \left( QA_i - \sum_{t \in \phi(i)} ty_{it} \right) \quad \forall\, i \in \lambda. \tag{17b}$$

$$QA_i \geq QA_j \quad \forall\, i \in \lambda,\ j \rightarrow next\_in\_P(i). \tag{18b}$$

$$QA_i \geq \sum_{k \in \phi(j)} ky_{jk} \quad \forall\, i \in \lambda,\ j \rightarrow next\_in\_P(i). \tag{19b}$$

To compute the pay protection for pilots in the training set that are already pay protected at the beginning of the planning horizon, or pay protected because they are advanced after the effective date, the following two constraints are added:

If a pilot already is pay-protected then, $$R_i \geq \left( \sum_{t \in \phi(i)} ty_{it} \right) - G_i \quad \forall\, i \in APP. \tag{20}$$

Otherwise, $$R_i \geq \left( \sum_{t \in \phi(i)} ty_{it} - BidEff_i \right) \quad \forall\, i \in \lambda. \tag{21}$$

To compute the pay protection for pilots 58 years old that could have held a position but the position was not awarded, $$R_{58i} \geq \left( N - \sum_{t \in \phi(i)} ty_{jt} \right) \quad \forall\, j \in PP_{58}(i),\ i \in 58Y. \tag{22}$$

To compute the pay protection for pilots 58 years old that hold a position but could have held a better one, the following four constraints may be applied:

$$RF_i \geq \left( N - R_{58i} - \sum_{t \in \phi(i)} ty_{it} + R_i \right) \quad \forall\, i \in \lambda_2. \tag{23}$$

$$M_i \geq (R_i - (N+1)A_{1i}) \quad \forall\, i \in \lambda_2. \tag{24}$$

$$M_i \geq (RF_i - (N+1)A_{2i}) \quad \forall\, i \in \lambda_2. \tag{25}$$

$$A_{1i} + A_{2i} = 1 \quad \forall\, i \in \lambda_2. \tag{26}$$

To ensure that pilots 60 years old with no award are released in reverse seniority order, $$\sum_{t=k}^{N} y_{NAit} - \sum_{t=k}^{N} y_{NAi-1t} \geq 0 \quad \forall\, i \in NA, k \in \{1 \ldots N\}. \tag{27}$$

To ensure that furlough pilots are released in reverse seniority order, $$\sum_{t=k}^{N} y_{Fit} - \sum_{t=k}^{N} y_{Fi-1t} \geq 0 \quad \forall\, i \in F, k \in \{1 \ldots N\}. \tag{28}$$

The following four constraints ensure nonnegative variable values, $$R_i \geq 0 \;\; \forall i \in \lambda, \tag{29}$$

$$R_{58i} \geq 0 \;\; \forall i \in 58Y. \tag{30}$$

$$M_i \geq 0 \;\; \forall i \in \lambda_2. \tag{31}$$

$$RF_i \geq 0 \;\; \forall i \in \lambda_2. \tag{32}$$

Modifications To Model Based on Optimization Options

The user may define whether the cancellation of vacations will be allowed. The default position is that no vacations will be cancelled. To consider the vacations, the MIP Model will not include variables $y_{it}$ for bid periods in which pilot i cannot be advanced due to a vacation conflict. If the user wants to cancel vacations, variables will be defined for all bid periods in the MIP Model.

The user may also define whether a particular sub-base will be closed, and the last month pilots can reside in that particular location. To consider the closing of a sub-base, the MIP Model will not define variables $y_{it}$ for the months in which pilot i cannot be advanced due to a conflict with the sub-base closing date.

The user further may define whether a particular sub-base will be opened, and the first month that pilots can be assigned to that particular sub-base. To consider the opening of a sub-base, the MIP Model will not define variables $y_{it}$ for the months in which pilot i cannot be advanced due to a conflict with the sub-base opening date The user also may define whether a training plan is desired that accommodates the training of sixty year old pilots in the next class after their sixtieth birthday, or in any class during the planning horizon. The default position is to train in the next class after the pilot's sixtieth birthday. To consider the training of the 60 year old pilots, the MIP Model defines variables $y_{it}$ only for the months that correspond to the particular option chosen by the user.

The user may define earliest training start dates for all pilot positions. The model will define variables $y_{it}$ only for the months corresponding to possible training starts for pilots in each position.

A latest advance date for pilots with a given bid effective date may be specified by the user. The model will define variables $y_{it}$ only for the months corresponding to possible training starts for each position.

The user may determine whether to generate a training plan using block hours by fleet or by sub-base. If the user generates a scenario by sub-base, the block hours by sub-base will be computed from the block hours by fleet. The constraints of equations (15) and (16) will be generated by sub-base, and the variables $S_{ht}$ and $E_{ht}$ will be defined by sub-base instead of by fleet.

The user may enforce a training month or a set of training months for a specific pilot. If the user defines the training month or potential set of training months for a particular pilot, the variables $y_{it}$ for each pilot will be defined only for the appropriate month or months.

The user may allow training capacity to be exceeded for each fleet. If the user allows the training capacity for a particular fleet to be exceeded, the variable $Z_{ft}$ will be added to the constraint of equation (14) in the MIP Model as follows:

$$\sum_{i \in \varphi(t,f)} y_{i,t+L(i)} - z_{ft} \leq CAP_{ft} \quad \forall\, t, f. \tag{33}$$

The user may define the minimum number of training starts per fleet per bid period. If the user sets a minimum value different than zero for fleet f and bid period t, then the following constraint will be added to the model where MIN_f_t is the minimum number of training starts for fleet f in bid period t.

$$\sum_{i \in NH} y_{it+L(i)} \geq \text{MIN\_f\_t} \quad \forall\, t, f \tag{34}$$

The user may define the number of new hires per position, or let the optimizer engine 8 of FIG. 1 determine the optimal number of new hires. When the optimizer engine 8 is used, the user must define the maximum number of new hires per sub-base and an earliest date for hiring. The optimizer engine 8 will use as many new hires as needed up to the numbers defined by the user. If the user wants the optimizer engine 8 of FIG. 1 to decide an optimal number of new hires, then the equality "=" found in the constraint of equation (10) will be changed to an inequality "<=".

If the user wants a solution in which all new hires are clustered in groups of a given number and size and the user defines the total number of new hires, then the optimizer engine 8 will cluster as many groups of the size desired as possible. If the total number of new hires defined by the user is not a multiple of the desired group size, the solution will include one group of size different from the desired group size. If however the optimizer engine 8 defines the optimal number of new hires, and the user wants a solution with new hires clustered in groups, all groups in the solution will be of the desired size.

If the user wants to cluster the new hires into groups, and the user determines the number of new hires, the constraints of equations (35), (36), and (37) below will be added to the MIP Model. In these constraints MM is the desired multiple in which to hire, $K_t$ is an integer variable representing the number of groups of pilots of size MM that will be advanced in bid period t, $KK_t$ is an integer variable representing new hire pilots not in groups of size MM in bid period t, $P_t$ is a binary variable for pilots that will not be hired in a group (when the total number of pilots to hire is not a multiple of MM), and Residual is the total new hires modulus MM.

$$\sum_{i \in NH} y_{NHit+L(i)} - KK_t = MM * K_t \quad \forall t \quad (35)$$

$$KK_t \leq \text{Residual} * P_t \; \forall t \quad (36)$$

$$\sum_t P_t = 1 \quad (37)$$

If the user wants to cluster the new hires into groups, and the optimizer engine 8 determines the optimal number of new hires, the constraints of equations (38), (39), and (40) below will be added to the model.

$$\sum_{i \in NH} y_{NHit+L(i)} - KK_t = MM * K_t \quad \forall t \quad (38)$$

$$KK_t \leq MM * P_t \quad (39)$$

$$\sum_t P_t = 1 \quad (40)$$

The user may define the minimum number of new hires per bid period, the maximum number of new hires per bid period, and either a fixed number of new hires per position per month or a minimum number of new hires per position per month. If the user sets a maximum number of new hires per bid period, the following set of constraints will be added to the model, where MAX_NUM_t is the maximum number of new hires in bid period t.

$$\sum_h y_{NHht+L(h)} \leq \text{MAX\_NUM\_t} \quad \forall t \quad (41)$$

If the user constrains the minimum number of new hires per bid period, the constraints of equations (42) and (43) will be added to the model, where MIN_NUM_t is the minimum number of new hires in bid period t if any pilot will be hired, $MNH_t$ is a binary variable representing whether any pilot will be hired in bid period t, and $BigM_t$ is the total number of new hires.

$$\sum_h y_{NHht+L(h)} \geq \text{MIN\_NUM\_t} * MNH_t \quad \forall t \quad (42)$$

$$\sum_h y_{NHht+L(h)} \leq BigM_t * MNH_t \quad \forall t \quad (43)$$

The user may minimize percentage shortages and excesses of block hours, or total shortages and excesses in block hours. If the user wants to minimize total shortages and total excess instead of percentage shortage and percentage excess, the objective function will read as follows:

$$\text{Minimize} PNH \sum_t \sum_h NHCost_{ht} y_{NHht} + PNA \sum_t \sum_{i \in NA} NACost_{it} y_{it} + \quad (44)$$

-continued $$PF \sum_t \sum_{i \in F} FCost_{it} y_{it} + Ppay \left( \sum_{i \in \lambda_1} a_i R_i + \sum_{i \in 58Y} a_i R_{58i} + \sum_{i \in \lambda_2} a_i M_i \right) +$$

$$PS * PBH \sum_h \sum_t S_{ht} + PE * PBH \sum_h \sum_t E_{ht}$$

The user may restrict the optimizer engine 8 of FIG. 1 to build a solution with an absolute limit on the amount of shortage in a given position and a given bid period. If the user defines a maximum total shortage and/or a maximum total percentage shortage for a selected position and bid period, an upper bound will be added to the corresponding $S_{ht}$ variable of the constraint of equation (15). If the user adds both a maximum percentage and a maximum value, the upper bound on the variable will be given by the more restrictive of the two values.

The user may define to what extent the optimizer engine 8 of FIG. 1 should enforce class balance constraints by specifying a minimum percentage of ideal captain and first officer groupings for pilots in training classes. The ideal balance of pilots in classes is to have the same number of captains as first officers. This preference for building ideal groupings of pilots in training classes cannot always be enforced due to imbalances in the load of captains and first officers to train, but it can be enforced to the degree possible with the following additional constraints for all fleets. In the following constraints, $N_c$ is the number of captains that need to be trained, $N_f$ is the number of first officers that need to be trained, $C_t$ is an integer variable to track the number of captain imbalances in month t, $F_t$ is an integer variable to track the number of first officers imbalances in month t, % balance is the percent of possible ideal captain and first officer groupings chosen by the user to be enforced in the solution.

If Max $\{N_c, N_f\} = N_c$, then add the following constraint for each fleet and each bid period to track the groupings:

Σ captains going to training in month $t+C_t \geq$ Σ first officers going to training in month $t+F_t$, (45)

where the symbol ">=" means greater than or equal to.

Then add the following constraint to enforce the minimum percentage:

$$\sum_t C_t \leq N_f (1 - \% \text{ balance}) \quad (46)$$

If Max $\{N_c, N_f\} = N_f$, then add the following constraint for each fleet and each bid period to track the groupings:

Σ captains going to training in month $t+C_t \leq$ Σ first officers going to training in month $t+F_t$, (47)

where the symbol "<=" means less than or equal to.

Then add the following constraint to enforce the minimum percentage:

$$\sum_t F_t \leq N_c (1 - \% \text{ balance}) \quad (48)$$

The user may designate whether to train as many pilots as possible in the planning horizon, or to engage the optimizer engine 8 of FIG. 1 to determine how many pilots to train before the end of the planning horizon. If the user designates that the engine train as many pilots as possible, an overflow month is used to handle cases where the demand for pilots to train exceeds the capacity to train. When the user defines the percentage of pilots to be trained by the effective date to be less than 100%, the capacity of the overflow month is increased (based upon the percentage given) to allow the option not to train this percentage of the pilots.

The user defines the level of importance of each of the following factors in the MIP Model solution: block hour excess, block hour shortage, pay protection cost, new hires cost, no award cost, and furlough cost represented by the parameters PE, PS, Ppay, PNH, PNA, and PF respectively. When the user modifies the level of importance of any factor, the modification will be reflected in the objective function (7) of the MIP Model by altering the value of the parameters PE, PS, Ppay, PNH, PNA, and PF. By examining the objective function (7), one observes that these parameters act as weights increasing or decreasing the relative importance of their corresponding cost.

The user may further exclude certain costs in the computation of a solution. Costs excluded by the user will be removed from the objective function of the MIP Model as well as appropriate constraints. For example, if the user does not include pay protection cost, then the constraints represented by equations (17b), (18b), (19b), (17b), (18b), (19b), (20), (21), (22), (23), (24), (25) and (26) above will not be included in the MIP Model, and the term $$Ppay\left(\sum_{i\in\lambda_1} a_i R_i + \sum_{i\in 58Y} a_i R_{58i} + \sum_{i\in\lambda_2} a_i M_i\right)$$

will not be included in the objective function (7) of the MIP Model.

Figure 3:
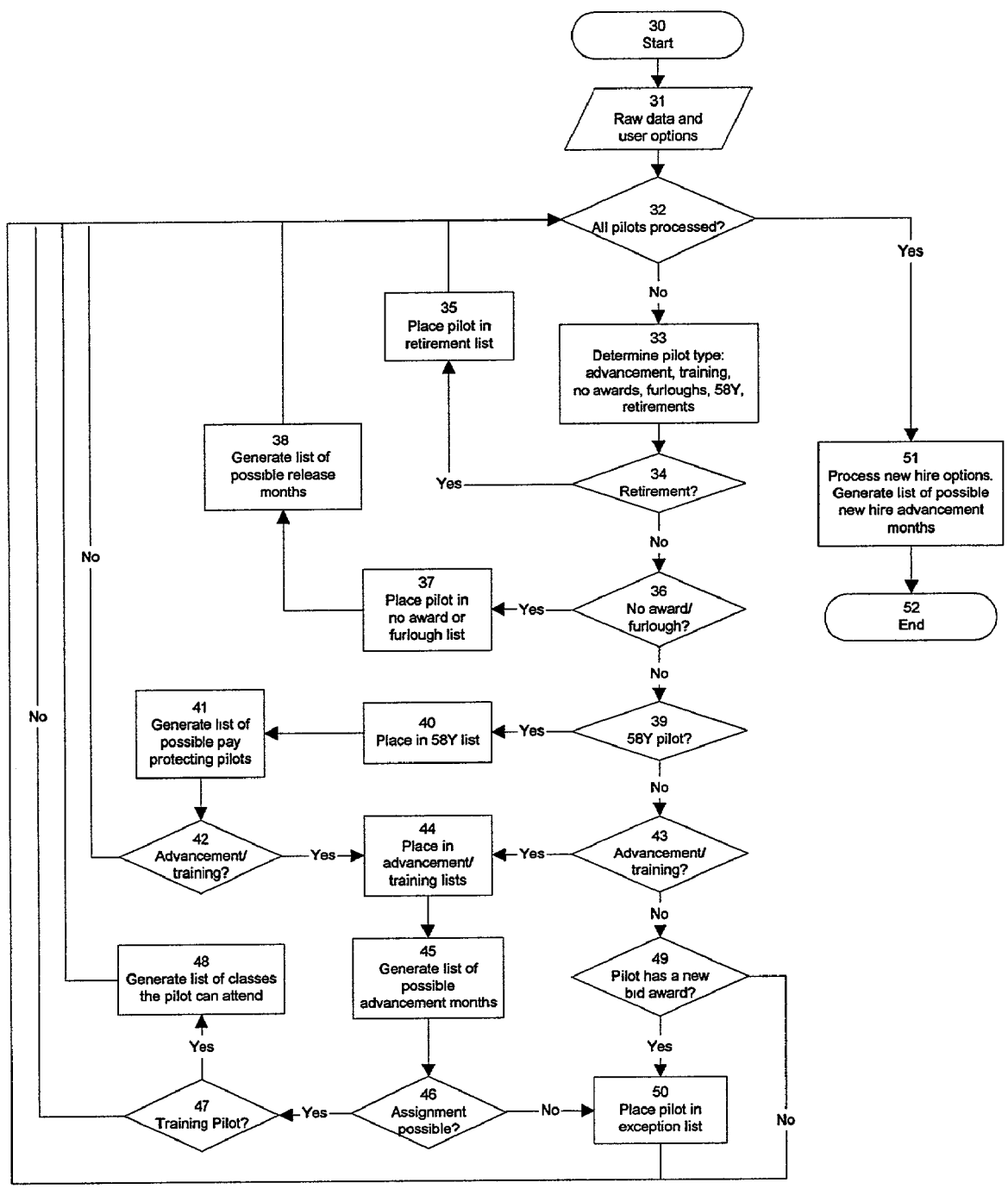
FIG. 3 is a logic flow diagram of the preprocessing stage 22 of FIG. 2.

The preprocessing stage of logic step 22 of FIG. 2 is illustrated in more detail in FIG. 3, where the previously described content of the input data module at logic step 21 is supplied in the form of an XML document to an XML processor. The data supplied consists of general information regarding each pilot in the airline, and specifically each pilot's bid award for the system bid for which a training plan is being created. FIG. 3 shows how each pilot's information is sorted in preparation for the model creation stage of logic step 23 of FIG. 2.

Referring to FIG. 3, the logic flow process enters the optimization engine 8 at logic step 30, and then proceeds to logic step 31 where data from the optimizer data provider 7 of FIG. 1 is received. The data includes pilot data such as system bid award information, average pay hours, new hire information, pilot utilization, pay protection, pilot vacation and absence information, and retirement criteria. Other information is also included such as block hour requirements per position each bid period, as well as user options such as the level of importance of each cost factor, and sub-base settings. With this data, the logic flow process continues to logic step 32 and enters a loop that will analyze the data for each pilot. The other pieces of data do not require processing and are stored for use in the model creation stage of logic step 23 of FIG. 2. Through this analysis of pilot data, lists and internal data structures are prepared for the model creation stage of logic step 23.

The logic flow process next advances from logic step 32 to logic step 33 of FIG. 3 where the pilot lists are separated into specific types including advancement, retirement, training, no awards, and furloughs. Logic steps 34, 36, 39, 43, and 49 represent logic decisions that separate the pilots by type for appropriate processing. Upon the logic flow process moving from logic step 33 to logic step 34, a determination is made as to whether a pilot under consideration is a retirement pilot. If so, the logic flow process proceeds to logic step 35 where pilots who are retiring are placed in a retirement list. The logic flow process then returns to logic step 32 to determine whether there are any further pilots to process, and thereafter continues as before described.

If a retirement pilot is not identified at logic step 34, the logic flow process advances to logic step 36 where no award and furlough pilots are identified. If a no award or furlough pilot is being processed, the logic flow process jumps to logic step 37 where the pilot is placed on a no award or furlough list, and then continues to logic step 38 to specify possible release months for the pilot. A pilot may be released in any month unless the user has entered a restriction that pilots may only be released in certain months. From logic step 38, the logic flow process loops back to logic step 32 to continue as before described.

If at logic step 36 it is determined that the pilot under consideration is neither a no award nor a furlough pilot, the logic flow process advances to logic step 39 where age 58 pilots are identified. If an age 58 pilot is identified, the logic flow process proceeds to logic step 40 where the pilot is placed on an age 58 pilot list, and then continues to logic step 41 to determine which pilots may cause pay protection for the pilot under consideration. The logic flow process then moves to logic step 42 where it is determined whether the pilot under consideration requires advancement or training. If not, the logic flow process loops back to logic step 32 to continue as before described. However, if the age 58 pilot does require advancement or training, the flow process proceeds to logic step 44 as more particularly described below.

If at logic step 39 no 58 year old pilot is identified, the logic flow process advances to logic step 43 where advancement and training pilots are identified. If an advancement or training pilot is identified, the logic flow process moves to logic step 44 where the pilot is placed on an advancement or training list, and then continues to logic step 45 where possible advancement months are determined. Pilot advancement months are limited by their awarded vacation, user preferences, sub-base openings and closings, and available training resources. From logic step 45, the logic flow process advances to logic step 46 where it is determined whether there are any possible assignments for the pilot under consideration. If there are none, the logic flow process jumps to logic step 50 where the pilot is placed on an exception list. The exception list includes pilots who have no advancement months and thus no possible assignment, or who have inconsistent data. Following logic step 50, the logic flow process loops back to logic step 32 to continue as before described. If it is determined at logic step 46 that there are possible assignments for the pilot under consideration, the logic flow process proceeds from logic step 46 to logic step 47 where it is determined whether the pilot requires training. If the pilot does require training, the logic flow process moves from logic step 47 to logic step 48 where a list of possible classes the pilot can attend is generated, and then loops back to logic step 32 to continue as before described. If it is determined at logic step 47 that the pilot does not require training, the logic flow process loops back to logic step 32 to continue as before described.

If at logic step 43 it is determined that the pilot under consideration does not require training or advancement, the logic flow process advances to logic step 49 where pilots who have a new bid award but have not been separated are identified. If the pilot under consideration has a new bid award, the logic flow process advances to logic step 50 to continue as before described. If, however, it is determined at logic step 49 that the pilot has no new bid award, the logic flow process loops back to logic step 32 to continue as before described. When it is determined at logic step 32 that all pilots have been processed, the logic flow process proceeds to logic step 51 where new hire options chosen by the user are processed and a list of possible new hire months is generated. From logic step 51 the logic flow process continues to logic step 52 to transfer to the model creation stage 23 of FIG. 2 and perform in accordance with the logic flow diagram of FIG. 4 Referring to FIG. 4, the logic flow begins at logic step 60 and continues to logic step 61 where the preprocessed data prepared in the preprocessing stage of FIG. 3 is used to construct all of the variables and constraints needed to build the MIP Model (as described above) in view of the options chosen by the user. The left most column of logic steps is directed to the creation of variables, and the right most column of logic steps is directed to the creation of constraints.

Each variable that is created is a combination of a key and a value, and has a numeric type, a class type, and a list of the constraints of which it is a member. A key uniquely identifies a variable. For example, the key for a variable describing the advancement of a pilot is a combination of the pilot's ID and the month in which the pilot can advance. For variables describing the shortages in block hours for training, the triple of fleet, status and month is the key. The value of a variable refers to the value given upon solution of the MIP Model. The numeric type refers to the binary, integer, and continuous variable types. The class type of a variable refers to types such as assignment, block hour variable, and class balance variable.

Each constraint that is created is logically grouped into a constraint set, where each set corresponds to a specific class of constraints. For example, all constraints in the system that enforce the requirement that pilots have to be released in reverse seniority order can belong to a single constraint set. Whenever a constraint is added to a constraint set, all the variables that are part of the constraint are identified, and the constraint list for each variable is modified to include the constraint.

Figure 4:
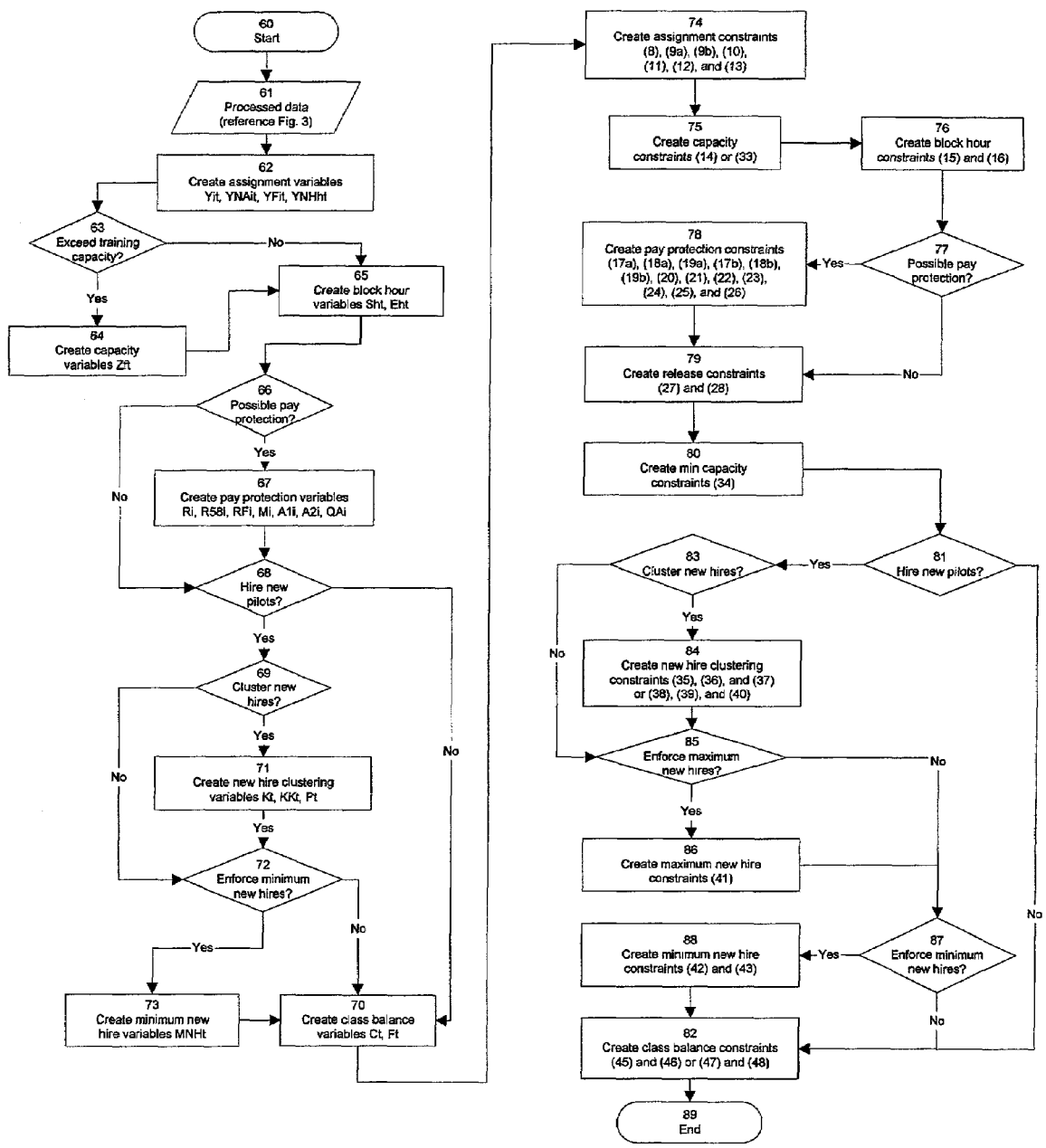
FIG. 4 is a logic flow diagram of the model creation stage 23 of FIG. 2.

From logic step 61 of FIG. 4, the logic flow process continues to logic step 62 where assignment variables are created from the lists previously created in the preprocessing stage of FIG. 3 for pilots who are training and advancing, no awards, furloughs, and new hires. The logic flow process then proceeds to logic step 63 to determine whether training capacities can be exceeded. If training capacity can be exceeded, the logic flow process continues to logic step 64 to create excess capacity variables for use in the capacity constraint of equation (33). If it is determined at logic step 63 that training capacity will not be exceeded, the logic flow process proceeds to logic step 65 where variables are created to track block hour shortages and excesses. The logic flow process then continues to logic step 66 where it is determined whether pay protection is possible. If so, the logic flow process advances to logic step 67 to create all pay protection variables. After logic step 67, or if it is determined at logic step 66 that no pay protection is possible, the logic flow process moves to logic step 68 where it is determined whether there are any possible new hires. If so, the logic flow process continues to logic step 69. If not, the logic flow process moves to logic step 70.

At logic step 69, if new hires are to be clustered into groups of a given size as specified by the user, the logic flow process continues to logic step 71 where new hire clustering variables are created. After logic step 71, or if no new hire clustering into groups has been specified at logic step 69, the logic flow process proceeds to logic step 72 where it is determined whether new hire minimums will be enforced. If yes, the logic flow process proceeds to logic step 73 where minimum new hire variables are created. From logic step 73, or if new hire minimums are not enforced at logic step 72, the logic flow process moves to logic step 70 where class balance variables are created.

From logic step 70, the logic flow process continues to logic step 74 where the creation of constraints begins with the assignment constraints of equations (8), (9a), (9b), (10), (11), (12), and (13). These constraints ensure that each pilot will be assigned a time to train, advance, be released, or be hired by the MIP Model. Following logic step 74, the logic flow process continues to logic step 75 where the capacity constraint of equation (14) or (33) is created, based upon the users specification, to allow the model to exceed or enforce training capacities. The logic flow process then continues to logic step 76 to create the constraints of equations (15) and (16) that track shortages and excesses in block hours at each position and each bid period respectively. The logic flow process thereafter moves to logic step 77 to determine whether pay protection is possible. If pay protection is possible, the logic flow process continues to logic step 78 to create the constraints of equations (17a), (18a), (19a), (17b), (18b), (19b), (20), (21), (22), (23), (24), (25), and (26), to manage pay protection for pilots who are advancing, displaced, age 58, and already pay protected. After logic step 78, or it is determined at logic step 77 that no pay protection is possible, the logic flow process moves to logic step 79 where the creation of the constraints of equations (25) and (26) takes place. These constraints manage the release of no award and furlough pilots.

From logic step 79, the logic flow process proceeds to logic step 80 where the minimum capacity constraints of equation (34) are created. Thereafter, the logic flow process moves to logic step 81 where if no possible new hires are specified, the logic flow process continues to logic step 82. If new hires are specified at logic step 81, however, the logic flow process continues to logic step 83. If new hire clustering into groups is specified at logic step 83, the logic flow process proceeds to logic step 84. At logic step 84, the new hire clustering constraints of equations (35), (36), and (37) are created if the user defines the exact number of new hires. If the user specifies that the optimizer engine 8 of FIG. 1 will define the optimal number of new hires, the constraints of equations (38), (39), and (40) are created to manage the clustering of new hires. From logic step 84, or if no clustering of new hires is specified at logic step 83, the logic flow process moves to logic step 85 where it is determined whether new hire maximums are to be enforced. If yes, the logic flow process advances to logic step 86 to create the maximum new hire constraints of equation (41), and then continues to logic step 87. If it is determined at logic step 85 that the new hire maximum is not to be enforced, the logic flow process jumps to logic step 87 to determine whether the minimum new hire constraints are to be enforced. If yes, the logic flow process proceeds to logic step 88 where the constraints of equations (42) and (43) that bound the minimum number of new hires are generated. From logic step 88, or if it is determined at logic step 87 that minimum new hire constraints will not be enforced, the logic flow process moves to logic step 82 where the class balance constraints of equations (45) and (46) are created if there are more captains training than first officers, and the constraints of equations (47) and (48) are created if there are more first officers than captains training. After logic step 82, the logic flow process moves to logic step 89 to transfer to the solution and postprocessing stage of logic step 24 of FIG. 2 and perform in accordance with the logic flow diagram of FIG. 5.

Figure 5:
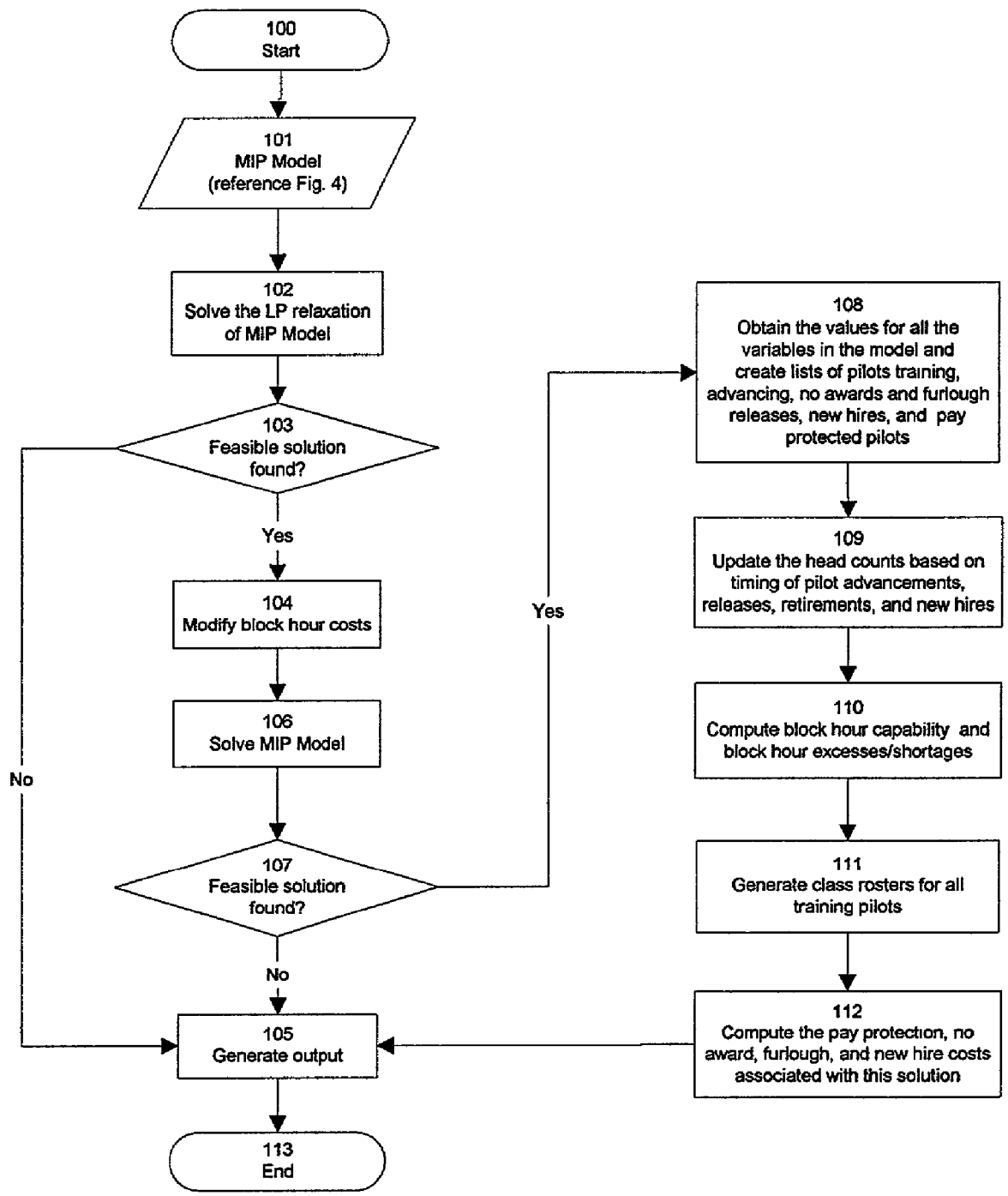
FIG. 5 is a logic flow diagram of the solution and postprocessing stage 24 of FIG. 2.

Referring to FIG. 5, the logic flow process begins at logic step 100, and proceeds to logic step 101 with the MIP Model prepared in the model creation stage of logic step 23 of FIG. 2. The MIP Model is solved and the results are used to derive a training plan to display to the user. The leftmost column of logic steps in FIG. 5 describes the model solution process, and the rightmost column of logic steps illustrate the derivation of a training plan from the model solution.

From logic step 101, the logic flow process proceeds to logic step 102 where the linear programming relaxation of the MIP Model (LP Model) is solved. The LP Model is obtained by relaxing the integrality of all binary and integer variables in the MIP Model, i.e., by treating them as continuous variables instead of binary and integer variables. This relaxation of variables results in a mathematical problem that can be solved much more efficiently than the original MIP Model. Our experience indicates that the resulting LP Model can be solved in seconds using commercially available software development kits and runtime libraries such as ILOG Concert Technology 1.0 and ILOG CPLEX 7.0 sold by ILOG, Inc. of Paris, France. The invention integrates such commercially available software development kits and runtime libraries to solve the mathematical models in logic step 102 and 106.

From logic step 102, the logic flow process continues to logic step 103 to determine whether a feasible solution exists for the LP Model solved in logic step 102. If a feasible solution exists at logic step 103, the logic flow process advances to logic step 104. If a feasible solution does not exist at logic step 103, however, the logic flow process jumps to logic step 105 where output informing the user of the infeasible solution is generated.

An infeasible problem occurs when constraints are defined in such a way that there is no way to assign a value to every variable and still satisfy all of the constraints. A simple example is illustrated with the following two constraints bounding a continuous variable x: x<5 and x>7. There is no assignment for the variable x that will satisfy both constraints. For the LP Model solved at logic step 102 some possible reasons for infeasibility are listed below: (1) the user specifies a bound on shortages for a specific position and bid period, but there are not enough pilots assigned to that position to meet the bound; (2) the training capacity is not sufficient to train all pilots by the effective date chosen; and (3) there is sufficient capacity to train a group of pilots spread out over a number of months, but the pilots have very limited months in which to train due to vacation, or closing and opening of sub-bases.

At logic step 104, the LP Model solution of logic step 102 is used to modify the block hour shortage and excess costs, PS and PE respectively, used in the objective function of the MIP Model. The LP Model provides an estimate of the dollar costs of the MIP Model and of the block hour shortages and excesses. The dollar costs in the model are the costs relating to pay protection, new hires, no awards, and furloughs, Ppay, PNH, PNA, and PF respectively. To place higher emphasis on meeting block hours than on the dollar costs in the MIP Model, the block hour costs are modified to have a value roughly twice as large as the dollar costs based on the solution to the LP Model. From logic step 104, the logic flow process continues to logic step 106 where the MIP Model is solved. Our experience indicates that the MIP Model can be solved in less than an hour using commercially available software development kits and runtime libraries as described above.

The logic flow process next proceeds from logic step 106 to logic step 107 where a determination is made as to whether a feasible solution was found. If yes, the logic flow process jumps to logic step 108 to commence the development of a training plan from the solution to the MIP Model.

At logic step 108, the assigned variable values from the MIP Model solution are transformed into lists showing pilot training, advancement, no awards and furlough releases, new hires, and pay protected pilots. After logic step 108, the logic flow process advances to logic step 109 where headcounts are updated based upon the timing of training, advancement, no awards and furlough releases, and new hires to show how many pilots will be in each position over time. The logic flow process then continues to logic step 110 where block hour capability is calculated by multiplying the updated headcount by pilot utilization values for each position and bid period. The block hour capability shows how much work can be done in each position in each bid period. This capability is then compared to the required block hours for each position in each bid period to determine any block hour shortages or excesses. Following logic step 110, the logic flow process advances to logic step 111 where all pilots who are going to training are placed on class rosters in the bid period determined by the model. Thereafter, the logic flow process continues to logic step 112 where the dollar costs associated with the solution are computed as shown below in equations (49)-(53).

$$\text{No Award Cost} = PNA \sum_t \sum_{i \in NA} NACost_{it} y_{it} \qquad (49)$$

$$\text{Furlough Cost} = PF \sum_t \sum_{i \in F} FCost_{it} y_{it} \qquad (50)$$

$$\text{New Hire Cost} = PNH \sum_t \sum_{i \in NH} NHCost_{it} y_{it} \qquad (51)$$

$$\text{Pay Protection Cost} = Ppay \left( \sum_{i \in \lambda_1} a_i R_i + \sum_{i \in 58Y} a_i R_{58Y} + \sum_{i \in \lambda_2} a_i M_i \right) \qquad (52)$$

Total Cost=No Award cost+Furlough cost+New Hire Cost+Pay Protection Cost. (53)

The logic flow process then proceeds from logic step 112 to logic step 105 where the solution information generated in logic steps 108-112 is transformed into training plan reports for access by the user.

From logic step 105, the logic flow process moves to logic step 113 to end the process.

The present invention has been particularly shown and described in detail with reference to a preferred embodiment, which is merely illustrative of the principles of the invention and is not to be taken as a limitation to its scope. It further will be readily understood by those skilled in the art, operations research, that substitution of equivalent elements, reordering of steps, and other modifications and alterations of the invention may occur without departing from the scope and spirit of the invention. The appended claims are intended to include within their scope such modifications and alterations.

What is claimed is:

1. An adaptive, dynamic, integrated, and automated optimizer system for rapid generation of alternative pilot training plans in response to a user request, which comprises:
   a data base system having stored therein system bid information, pilot data, training information, and user request information including optimization options selected by said user request;
   an optimizer controller in electrical communication with said data base system for receiving and acknowledging said user request, and generating therefrom an optimizer session for storage in said data base;
   an optimizer container in electrical communication with said optimizer controller and receiving said optimizer session for issuing data requests and training plan generation requests;
   an optimizer data provider in electrical communication with said optimizer container and said data base system, and receiving said data requests for retrieving data from said data base system for use in the generation of said alternative pilot training plans; and
   an optimizer engine in electrical communication with said optimizer container and said optimizer data provider for generating a mixed integer programming model of said optimizer session in response to said training plan generation requests and based upon data retrieved by said optimizer data provider from said data base system, for solving a linear program relaxation of said mixed integer programming model and thereafter solving said mixed integer programming model to provide a feasible optimized solution, and for deriving an optimized pilot training plan from said feasible optimized solution;
   wherein said mixed integer programming model is comprised of an objective function with variables and constraints, and said objective function is:

$$\text{Minimize } PNH \sum_t \sum_h NHCost_{ht} y_{NHht} + PNA \sum_t \sum_{i \in NA} NACost_{it} y_{it} +$$

$$PF \sum_t \sum_{i \in F} FCost_{it} y_{it} + Ppay \left( \sum_{i \in \lambda_1} a_i R_i + \sum_{i \in 58Y} a_i R_{581} + \sum_{i \in \lambda_2} a_i M_i \right) +$$

$$PS * PBH \sum_h \sum_t S_{ht} / Block_{ht} + PE * PBH * (1/3) \sum_h \sum_t E_{ht} / Block_{ht}$$

wherein PNH is Level of importance of New Hire Cost in the solution;
NHCost$_{ht}$ is Cost per new hire advanced to position h in period t (computed as the number of month between t and the end of the planning horizon, times the pay rate, times the average pay hours);
PNA is Level of importance of no-awards cost in the solution;
NACost$_{it}$ is Cost if pilot i NA is released in bid period t (computed as the number of months between t and the beginning of the planning horizon, times the pay rate, times the average pay hours);
FCost$_{it}$ is Cost if pilot i F is furloughed in bid period t (computed as the number of months between t and the beginning of the planning horizon, times the pay rate, times the average pay hours);
Ppay is Level of importance of pay protection cost in the solution;
PS is Level of importance of shortages in block hours in the solution;
PE is Level of importance of excess in block hours in the solution;
PF is Level of importance of furloughs cost in the solution;
PBH is Cost associated to each block hour missed due lack of crews; and
Block$_{ht}$ is Business plan block hours for position h in bid period t.

2. The adaptive, dynamic, integrated, and automated optimizer system of claim 1, wherein two of said constraints respectively cause all pilots who are straight advances to a same position to be advanced in seniority order, and all pilots who are straight displacements to be advanced in reverse seniority order as follows:

$$\sum_t ty_{it} - \sum_t ty_{i+1t} \leq 0 \quad \forall\, h, i \in SA(h), \text{ and}$$

$$\sum_t ty_{i+1t} - \sum_t ty_{it} \leq 0 \quad \forall\, h, i \in SD(h).$$

3. The adaptive, dynamic, integrated, and automated optimizer system of claim 1, wherein two of said constraints track shortages in block hours per position, and excesses in block hours per position as follows:

$$\left( \sum_{i \in H(h), k \leq t} y_{ik} * uti_{hk} - \sum_{i \in H'(h), k \leq t} y_{ik} * uti_{hk} \right) - S_{ht} \leq$$

$$Initial_{ht} - Blockhrs_{ht}(1 - \alpha_{ht}) \quad \forall\, (h, t),$$

and $$\left( \sum_{i \in H(h), k \leq t} y_{ik} * uti_{hk} - \sum_{i \in H'(h), k \leq t} y_{ik} * uti_{hk} \right) + E_{ht} \geq$$

$$Initial_{ht} - Blockhrs_{ht}(1 + \beta_{ht}) \quad \forall\, (h, t),$$

wherein Uti$_{ht}$ is Number of crew hours utilization in position h in bid period t; and
Initial$_{ht}$ is Initial number of hours for position h in the bid period t and is obtained by multiplying number of pilots in a given position in a bid period by respective utilization, and headcount includes retirements and absences.

4. The adaptive, dynamic, integrated, and automated optimizer system of claim 1, wherein said constraints include three constraints to determine pay protection for pilots in a training set based on an order in which said pilots are trained and advanced, as follows:

$$R_i \geq \left( \sum_{t \in \phi(i)} ty_{it} - QA_i \right) \quad \forall\, i \in \lambda,$$

$$QA_i \leq QA_j \quad \forall\, i \in \lambda,\, j \to \text{next\_in\_}P(i), \text{ and}$$

$$QA_i \leq \sum_{k \in \phi(j)} ky_{jk} \quad \forall\, i \in \lambda,\, j \to \text{next\_in\_}P(i).$$

5. The adaptive, dynamic, integrated, and automated optimizer system of claim 1, wherein said constraints include three constraints to determine pay protection for displaced pilots in a training set based on an order in which said displaced pilots are trained and advanced, as follows:

$$R_i \geq \left(QA_i - \sum_{t \in \phi(i)} ty_{it}\right) \quad \forall\, i \in \lambda,$$

$$QA_i \geq QA_j \quad \forall\, i \in \lambda,\, j \to \text{next\_in\_}P(i),\text{ and}$$

$$QA_i \geq \sum_{k \in \phi(j)} ky_{jk} \quad \forall\, i \in \lambda,\, j \to \text{next\_in\_}P(i).$$

6. The adaptive, dynamic, integrated, and automated optimizer system of claim 1, wherein said constraints include two constraints to respectively determine pay protection for pilots in a training set that are already pay protected at a beginning of a planning horizon, and pay protection for pilots in a training set that are pay protected because they are advanced after an effective date, as follows:

$$R_i \geq \left(\sum_{t \in \phi(i)} ty_{it}\right) - G_i \quad \forall\, i \in APP,\text{ and}$$

$$R_i \geq \left(\sum_{t \in \phi(i)} ty_{it} - BidEff_i\right) \quad \forall\, i \in \lambda.$$

7. The adaptive, dynamic, integrated, and automated optimizer system of claim 1, wherein said constraints include a constraint to determine pay protection for pilots 58 years old that could have held a position but said position was not awarded, as follows:

$$R_{58i} \geq \left(N - \sum_{t \in \phi(i)} ty_{jt}\right) \quad \forall\, j \in PP_{58}(i),\, i \in 58Y.$$

8. The automated optimizer system of claim 1, wherein said constraints include four constraints to determine pay protection for pilots 58 years old that hold a position but could have held a better one, as follows:

$$RF_i \geq \left(N - R_{58i} - \sum_{t \in \phi(i)} ty_{it} + R\right) \quad \forall\, i \in \lambda_2,$$

$$M_i \geq (R_i - (N+1)A_{1i}) \quad \forall i \in \lambda_2,$$

$$M_i \geq (RF_i - (N+1)A_{2i}) \quad \forall i \in \lambda_2,\text{ and}$$

$$A_{1i} + A_{2i} = 1 \quad \forall i \in \lambda_2.$$

9. The adaptive, dynamic, integrated, and automated optimizer system of claim 1, wherein said user request includes number of new hires and a request to cluster new hires into groups, and said constraints include following three constraints:

$$\sum_{i \in NH} y_{NHit+L(i)} - KK_t = MM * K_t \quad \forall\, t,$$

$$KK_t \leq \text{Residual} * P_t \quad \forall\, t,\text{ and}$$

$$\sum_t P_t = 1.$$

10. The adaptive, dynamic, integrated, and automated optimizer system of claim 1, wherein said user request includes a requirement to cluster new hires into groups, and said optimizer engine determines an optimal number of new hires, and said constraints include following three constraints:

$$\sum_{i \in NH} y_{NHit+L(i)} - KK_t = MM * K_t \quad \forall\, t,$$

$$KK_t \leq MM * P_t \quad \forall\, t,\text{ and}$$

$$\sum_t P_t = 1.$$

11. The adaptive, dynamic, integrated, and automated optimizer system of claim 1, wherein said user request includes a requirement for said optimizer engine to determine balance of captains and first officers in groups for a training class, and Max $\{N_c, N_f\} = N_c$, then a first of following constraints is added to said constraints for each fleet and each bid period to track said groups, and a second of said following constraints is added thereafter to said constraints to enforce minimum percentage:

Σ captains going to training in bid period $t+C_t \geq$ Σ first officers going to training in bid period $t+F_t$, and $$\sum_t C_t \leq N_f(1 - \%\text{ balance}).$$

12. The adaptive, dynamic, integrated, and automated optimizer system of claim 1, wherein said user request includes a requirement for said optimizer engine to determine balance of captains and first officers in groups for a training class, and Max $\{N_c, N_f\} = N_f$, then a first of following constraints is added to said constraints for each fleet and each bid period to track said groups, and a second of said following constraints is added thereafter to said constraints to enforce minimum percentage:

Σ captains going to training in bid period $t+C_t \geq$ Σ first officers going to training in bid period $t+F_t$, and $$\sum_t F_t \leq N_c(1 - \%\text{ balance}).$$

13. The adaptive, dynamic, integrated, and automated optimizer system of claim 1, which further includes an optimizer protocol layer in electrical communication with a user and said optimizer controller for accommodating interactive communications between said user and said optimizer controller.

14. The adaptive, dynamic, integrated, and automated optimizer system of claim 1, wherein said optimizer engine determines costs associated with said LP relaxation, and uses said costs to modify cost factors of an objective function of said MIP Model to provide weightings of both block hour and dollar costs.

15. The adaptive, dynamic, integrated, and automated optimizer system of claim 1, wherein said optimizer engine minimizes an objective function of said mixed integer programming model to have a lowest value within a region defined by said constraints.

16. The adaptive, dynamic, integrated, and automated optimizer system of claim 1, wherein parameters of said mixed integer programming model are altered to provide multiple alternative solutions of said mixed integer programming model.

17. A method for rapidly generating alternative optimized plans for training airline pilots, which comprises the following steps:
receiving training problem information including system bid information, pilot data, and training information by way of a data input device, and a user request by way of a user interface, wherein said user request includes optimization options for generating said alternative optimized plans;
sorting said training problem information for each of said airline pilots for addition to a set of lists;
creating variables and constraints from said set of lists, and an MIP Model from said variables and said constraints, wherein MIP is a mix integer programing;
solving a linear programming relaxation of said MIP Model to generate a first solution with said variables having first values;
if said first solution is feasible, modifying block hour costs to have a value roughly twice as large as dollar costs;
solving said MIP Model to generate a second solution with said variables having second values; and
if said second solution is feasible, generating a training plan with associated costs from said second values;
wherein said MIP Model is comprised of an objective function with variables and constraints, and said objective function is:

$$\text{Minimize } PNH \sum_t \sum_h NHCost_{ht} y_{NHht} + PNA \sum_t \sum_{i \in NA} NACost_{it} y_{it} +$$
$$PF \sum_t \sum_{i \in F} FCost_{it} y_{it} + Ppay \left( \sum_{i \in \lambda_1} a_i R_i + \sum_{i \in 58Y} a_i R_{58i} + \sum_{i \in \lambda_2} a_i M_i \right) +$$
$$PS * PBH \sum_h \sum_t S_{ht} / Block_{ht} + PE * PBH * (1/3) \sum_h \sum_t E_{ht} / Block_{ht}$$

wherein PNH is Level of importance of New Hire Cost in the solution;
$NHCost_{ht}$ is Cost per new hire advanced to position h in period t (computed as the number of month between t and the end of the planning horizon, times the pay rate, times the average pay hours);
PNA is Level of importance of no-awards cost in the solution;
$NACost_{it}$ is Cost if pilot i NA is released in bid period t (computed as the number of months between t and the beginning of the planning horizon, times the pay rate, times the average pay hours);
$FCost_{it}$ is Cost if pilot i F is furloughed in bid period t (computed as the number of months between t and the beginning of the planning horizon, times the pay rate, times the average pay hours);

Ppay is Level of importance of pay protection cost in the solution;
PS is Level of importance of shortages in block hours in the solution;
PE is Level of importance of excess in block hours in the solution;
PF is Level of importance of furloughs cost in the solution;
PBH is Cost associated to each block hour missed due lack of crews; and
$Block_{ht}$ is Business plan block hours for position h in bid period t.

18. The method of claim 17, wherein said set of lists includes a retirement list, a no award list, a furlough list, a list of possible release months for pilots in said no award list and said furlough list, a list of 58 year old pilots, an advancement training list, a list of advancement months for pilots in said advancement training list, a list of classes to attend, a list of possible pay protecting pilots, an exception list, and a list of possible new hire advancement months.

19. The method of claim 17, wherein the step of generating a training plan includes the following steps:
creating a second set of lists including a list of pilots to be trained, a list of advancement pilots, a list of no award pilots, a list of furlough pilots, a list of release pilots, and a list of new hire pilots from said second values;
determining pilot headcount in each position each day from times of occurrence of pilot training, pilot advancement, no award releases, furlough releases, and hiring of new hires;
calculating block hour capability by multiplying said pilot headcount by pilot utilization values provided by a user for each position and each bid period;
comparing said block hour capability with required block hours provided by said user for each position and each bid period to determine block hour shortages and block hour excesses;
creating class rosters for said pilots to be trained for each bid period;
compute dollar casts associated with said second solution; and
preparing training plan based upon said second set of lists, said pilot headcount, said block hour shortages, said block hour excesses, said class rosters, and said dollar costs.

20. The method of claim 19, wherein said training plan includes values for all of said variables in said MIP Model, and at least one of said list of advancement pilots, said list of pilots to be trained, said list of no award pilots, said list of furlough pilots, said list of possible pay protecting pilots, and class rosters for all pilots to be trained.

21. The method of claim 19, wherein said dollar costs include at least one of new hire, pay protection, no award, and furlough costs.

22. The method of claim 17, wherein said training plan includes at least one of pay protection costs, no award costs, furlough costs, and new hire costs associated with said second solution.

23. The method of claim 17, wherein said MIP Model is comprised of an objective function with said variables and said constraints.

24. The method of claim 17, wherein said optimization options include level of importance of cost factors in said objective function.

25. The method of claim 17, wherein two of said constraints respectively cause all of said airline pilots who are straight advances to a same position to be advanced in seniority order, and all of said airline pilots who are straight displacements to be advanced in reverse seniority order as follows:

$$\sum_t ty_{it} - \sum_t ty_{i+1\,t} \le 0 \quad \forall\, h, i \in SA(h), \text{ and}$$

$$\sum_t ty_{i+1\,t} - \sum_t ty_{it} \le 0 \quad \forall\, h, i \in SD(h).$$

26. The method of claim 17, wherein two of said constraints track shortages in block hours per position, and excesses in block hours per position as follows:

$$\left(\sum_{i\in H(h), k\le t} y_{ik} * uti_{hk} - \sum_{i\in H'(h), k\le t} y_{ik} * uti_{hk}\right) - S_{ht} \le$$

$$\text{Initial}_{ht} - Blockhrs_{ht}(1 - \alpha_{ht}) \,\forall\, (h, t),$$

and $$\left(\sum_{i\in H(h), k\le t} y_{ik} * uti_{hk} - \sum_{i\in H'(h), k\le t} y_{ik} * uti_{hk}\right) + E_{ht} \ge$$

$$\text{Initial}_{ht} - Blockhrs_{ht}(1 + \beta) \,\forall\, (h, t).$$

wherein $Uti_{ht}$ is Number of crew hours utilization in position h in bid period t; and
$Initial_{ht}$ is Initial number of hours for position h in the bid period t and is obtained by multiplying number of pilots in a given position in a bid period by respective utilization, and headcount includes retirements and absences.

27. The method of claim 17, wherein said constraints include three constraints to determine pay protection for said airline pilots in a training set based on an order in which said airline pilots are trained and advanced, as follows:

$$R_i \ge \left(\sum_{t\in\phi(i)} ty_{it} - QA_i\right) \quad \forall\, i \in \lambda,$$

$$QA_i \le QA_j \quad \forall\, i \in \lambda, j \rightarrow \text{next\_in\_P}(i), \text{ and}$$

$$QA_i \le \sum_{k\in\phi(j)} k y_{jk} \quad \forall\, i \in \lambda, j \rightarrow \text{next\_in\_P}(i).$$

28. The method of claim 17, wherein said constraints include three constraints to determine pay protection for displaced pilots in a training set based on an order in which said displaced pilots are trained and advanced, as follows:

$$R_i \ge \left(QA_i - \sum_{t\in\phi(i)} ty_{it}\right) \quad \forall\, i \in \lambda,$$

$$QA_i \ge QA_j \quad \forall\, i \in \lambda, j \rightarrow \text{next\_in\_P}(i), \text{ and}$$

$$QA_i \ge \sum_{k\in\phi(j)} k y_{jk} \quad \forall\, i \in \lambda, j \rightarrow \text{next\_in\_P}(i).$$

29. The method of claim 17, wherein said constraints include two constraints to respectively determine pay protection for said airline pilots in a training set that are already pay protected at a beginning of a planning horizon, and pay protection for said airline pilots in a training set that are pay protected because they are advanced after an effective date, as follows:

$$R_i \ge \left(\sum_{t\in\phi(i)} ty_{it}\right) - G_i \quad \forall\, i \in APP, \text{ and}$$

$$R_i \ge \left(\sum_{t\in\phi(i)} ty_{it} - BidEff_i\right) \quad \forall\, i \in \lambda.$$

30. The method of claim 17, wherein said constraints include a constraint to determine pay protection for said airline pilots 58 years old that could have held a position but said position was not awarded, as follows:

$$R_{58i} \ge \left(N - \sum_{t\in\phi(i)} ty_{jt}\right) \quad \forall\, j \in PP_{58}(i), i \in 58Y.$$

31. The method of claim 17, wherein said constraints include four constraints to determine pay protection for said airline pilots 58 years old that hold a position but could have held a better one, as follows:

$$RF_i \ge \left(N - R_{58i} - \sum_{t\in\phi(i)} ty_{it} + R_i\right) \quad \forall\, i \in \lambda_2,$$

$$M_i > (R_i - (N+1)A_{1i}) \,\forall i\in\lambda_2,$$

$$M_i \ge (RF_i - (N+1)A_{2i}) \,\forall i\in\lambda_2, \text{ and}$$

$$A_{1i} + A_{2i} = 1 \,\forall i\in\lambda_2.$$

32. The method of claim 17, wherein said user request includes number of new hires and a request to cluster new hires into groups, and said constraints include following three constraints:

$$\sum_{i\in NH} y_{NHit+L(i)} - KK_t - MM*K_t \quad \forall\, t,$$

$$KK_t \le \text{Residual} * P_t \quad \forall\, t, \text{ and}$$

$$\sum_t P_t = 1.$$

33. The method of claim 17, wherein said user request includes a requirement to cluster new hires into groups, and said optimizer engine determines an optimal number of said new hires, and said constraints include following three constraints:

$$\sum_{i\in NH} y_{NHit+L(i)} - KK_t = MM * k_t \quad \forall\, t,$$

$$KK_t \le MM * P_t \quad \forall\, t, \text{ and}$$

$$\sum_t P_t = 1.$$

34. The method of claim 17, wherein said user request includes a requirement for said optimizer engine to determine balance of captains and first officers in groups for a training class, and Max {$N_c$, $N_f$}=$N_c$, and a first of following constraints is added to said constraints for each fleet and each bid period to track said groups, and a second of said following constraints is added thereafter to said constraints to enforce minimum percentage:

Σ captains going to training in bid period $t+C_t>=$Σ first officers going to training in bid period $t+F_t$, and $$\sum_t C_t \le N_f(1 - \% \text{ balance}).$$

35. The method of claim 17, wherein said user request includes a requirement for said optimizer engine to determine balance of captains and first officers in groups for a training class, and Max {$N_c$, $N_f$}=$N_f$, and a first of following constraints is added to said constraints for each fleet and each bid period to track said groups, and a second of said following constraints is added thereafter to said constraints to enforce minimum percentage:

Σ captains going to training in bid period $t+C_t<=Y$ first officers going to training in bid period $t+F_t$, and $$\sum_t F_t \le N_c(1 - \% \text{ balance}).$$

36. A system for rapidly generating multiple alternative pilot training plans for all pilots in a entire airline, which comprises:
  a user interface receiving user requests and input data from a user, and providing status messages for informing said user;
  an optimizer system in electrical communication with said user interface for generating said status messages, and in response to receiving said user requests and said input data, rapidly generating said multiple alternative pilot training plans by creating variables and constraints, creating a mixed integer programming model from said variables and said constraints, and thereafter solving said mixed integer programming model; and
  a database in electrical communication with said optimizer system, and receiving said user requests, said input data, said status messages, and said multiple alternative pilot training plans from said optimizer system for storage and access by said user;
  wherein said mixed integer programming model is comprised of an objective function with variables and constraints, and said objective function is:

$$\text{Minimize } PNH \sum_t \sum_h NHCost_{ht} y_{NHht} + PNA \sum_t \sum_{i \in NA} NACost_{it} y_{it} +$$
$$PF \sum_t \sum_{i \in F} FCost_{it} y_{it} + Ppay\left(\sum_{i \in \lambda_1} a_i R_i + \sum_{i \in 58Y} a_i R_{581} + \sum_{i \in \lambda_2} a_i M_i\right) +$$
$$PS * PBH \sum_h \sum_t S_{ht}/Block_{ht} + PE * PBH * (1/3) \sum_h \sum_t E_{ht}/Block_{ht}$$

wherein PNH is Level of importance of New Hire Cost in the solution;
  $NHCost_{ht}$ is Cost per new hire advanced to position h in period t (computed as the number of month between t and the end of the planning horizon, times the pay rate, times the average pay hours);
  PNA is Level of importance of no-awards cost in the solution;
  $NACost_{it}$ is Cost if pilot i NA is released in bid period t (computed as the number of months between t and the beginning of the planning horizon, times the pay rate, times the average pay hours);
  $FCost_{it}$ is Cost if pilot i F is furloughed in bid period t (computed as the number of months between t and the beginning of the planning horizon, times the pay rate, times the average pay hours);
  Ppay is Level of importance of pay protection cost in the solution;
  PS is Level of importance of shortages in block hours in the solution;
  PE is Level of importance of excess in block hours in the solution;
  PF is Level of importance of furloughs cost in the solution;
  PBH is Cost associated to each block hour missed due lack of crews; and
  $Block_{ht}$ is Business plan block hours for position h in bid period t.

37. An optimizer engine system for rapid generation of pilot training plans which receives pilot data and user requests from a database system, and which comprises:
  means for operating upon said pilot data and user requests to build parameter lists, variable lists, and constraint lists;
  means for building a mixed integer programming model from said parameter lists, said variable lists, and said constraint lists;
  means for solving said mixed integer programming model to generate variable value solutions; and
  means for generating multiple alternative pilot training plans from said variable value solutions;
  wherein said mixed integer programming model is comprised of an objective function with variables and constraints, and said objective function is:

$$\text{Minimize } PNH \sum_t \sum_h NHCost_{ht} y_{NHht} + PNA \sum_t \sum_{i \in NA} NACost_{it} y_{it} +$$
$$PF \sum_t \sum_{i \in F} FCost_{it} y_{it} + Ppay\left(\sum_{i \in \lambda_1} a_i R_i + \sum_{i \in 58Y} a_i R_{581} + \sum_{i \in \lambda_2} a_i M_i\right) +$$
$$PS * PBH \sum_h \sum_t S_{ht}/Block_{ht} + PE * PBH * (1/3) \sum_h \sum_t E_{ht}/Block_{ht}$$

wherein PNH is Level of importance of New Hire Cost in the solution;
  $NHCost_{ht}$ is Cost per new hire advanced to position h in period t (computed as the number of month between t and the end of the planning horizon, times the pay rate, times the average pay hours);
  PNA is Level of importance of no-awards cost in the solution;
  $NACost_{it}$ is Cost if pilot i NA is released in bid period t (computed as the number of months between t and the beginning of the planning horizon, times the pay rate, times the average pay hours);

FCost$_{it}$ is Cost if pilot i F is furloughed in bid period t (computed as the number of months between t and the beginning of the planning horizon, times the pay rate, times the average pay hours);

Ppay is Level of importance of pay protection cost in the solution;

PS is Level of importance of shortages in block hours in the solution;

PE is Level of importance of excess in block hours in the solution;

PF is Level of importance of furloughs cost in the solution;

PBH is Cost associated to each block hour missed due lack of crews; and

Block$_{ht}$ is Business plan block hours for position h in bid period t.

38. The optimizer engine of claim 37, wherein parameters in said parameter lists are varied to determine those of said variable value solutions which are revenue enhancing.

39. The optimizer engine of claim 37, wherein said optimizer engine accommodates seamless integration into data processing environments.

40. The optimizer engine of claim 37, wherein said pilot training plans maximize pilot availability, optimize use of training resources, and track costs and events occurring in said pilot training plans.

41. The optimizer engine of claim 37, wherein said optimizer engine generates said alternative pilot training plans in less than one hour after receipt of said pilot data and user requests.

42. The optimizer engine of claim 37, wherein said means for solving generates and solves an LP relaxation of said mixed integer programming model to determine feasibility before solving said mixed integer programming model.

43. The optimizer engine of claim 42, wherein said means for solving calculates costs for said LP relaxation and generates therefrom modified objective function cost factors based upon block hour and dollar costs of said mixed integer programming model.

44. The optimizer engine of claim 38, wherein said parameters are comprised of sub-base openings, sub-base closings, vacation cancellations, levels of importance, costs, capacity, excesses, shortages, and training resource availability.

45. The optimizer engine of claim 44, wherein said levels of importance are generated for block hour excesses, block hour shortages, pay protection costs, new hire casts, no award costs, and furlough costs occurring in said mixed integer programming model.

46. The optimizer engine of claim 37, wherein said means for solving assigns each of said multiple alternative pilot training plans a comparative value to assist in selecting an optimum pilot training plan.

47. The optimizer engine of claim 37, wherein said multiple alternative pilot training plans include pay protection, instructor and pilot staffing, schedule for hiring new hires, optimum number of new hires per position, training assignments, advancements, and releases.

48. The optimizer engine of claim 37, wherein said means for solving optimizes said variable value solutions by minimizing an objective function of said mixed integer programming model to have a minimum value within a region defined by constraints in said constraint lists.

* * * * *

UNITED STATES PATENT AND TRADEMARK OFFICE
CERTIFICATE OF CORRECTION

PATENT NO.       : 7,346,528 B2
APPLICATION NO.  : 10/054343
DATED            : March 18, 2008
INVENTOR(S)      : Benjamin Glover Thengvall et al.

It is certified that error appears in the above-identified patent and that said Letters Patent is hereby corrected as shown below:

Title Page

Item (73) Delete "Navitaire, Inc." and insert -- Accenture Global Services GmbH --.

Claim 1

Column 23, line 46, delete "$R_{581}$" and insert -- $R_{58i}$ --.

Column 23, line 55, delete "month" and insert -- bid periods --.

Column 23, line 61, delete "months" and insert -- bid periods --.

Column 23, line 65, delete "months" and insert -- bid periods --.

Claim 8

Column 25, line 45, delete " $RF_i \geq \left( N - R_{58i} - \sum_{t \in \phi(i)} ty_{it} + R \right)$ " and insert -- $RF_i \geq (N - R_{58i} - \sum_{t \in \phi(i)} ty_{it} + R_t)$ --.

Column 25, line 48, delete "$\geqq$" and insert -- $\geq$ --.

Column 25, line 50, delete "$\geqq$" and insert -- $\geq$ --.

UNITED STATES PATENT AND TRADEMARK OFFICE
CERTIFICATE OF CORRECTION

PATENT NO. : 7,346,528 B2
APPLICATION NO. : 10/054343
DATED : March 18, 2008
INVENTOR(S) : Benjamin Glover Thengvall et al.

It is certified that error appears in the above-identified patent and that said Letters Patent is hereby corrected as shown below:

Claim 17

Column 27, line 55, delete "month" and insert -- bid periods --.

Column 27, line 61, delete "months" and insert -- bid periods --.

Column 27, line 65, delete "months" and insert -- bid periods --.

Claim 31

Column 30, line 35, delete "$\geqq$" and insert -- $\geq$ --.

Claim 32

Column 30, line 45, delete "- MM" and insert -- = MM --.

Claim 36

Column 31, line 61, delete "$R_{581}$" and insert -- $R_{58i}$ --.

Column 32, line 4, delete "month" and insert -- bid periods --.

Column 32, line 10, delete "months" and insert -- bid periods --.

Column 32, line 14, delete "months" and insert -- bid periods --.

UNITED STATES PATENT AND TRADEMARK OFFICE
CERTIFICATE OF CORRECTION

PATENT NO.        : 7,346,528 B2
APPLICATION NO.   : 10/054343
DATED             : March 18, 2008
INVENTOR(S)       : Benjamin Glover Thengvall et al.

It is certified that error appears in the above-identified patent and that said Letters Patent is hereby corrected as shown below:

Claim 37

Column 32, line 50, delete "$R_{581}$" and insert -- $R_{58i}$ --.

Column 32, line 59, delete "month" and insert -- bid periods --.

Column 32, line 65, delete "months" and insert -- bid periods --.

Column 33, line 2, delete "months" and insert -- bid periods --.

Signed and Sealed this

Nineteenth Day of August, 2008

JON W. DUDAS
*Director of the United States Patent and Trademark Office*